(12) United States Patent
Bathory-Frota et al.

(10) Patent No.: US 11,538,264 B2
(45) Date of Patent: Dec. 27, 2022

(54) APPARATUS, SYSTEM AND METHOD FOR AUTHENTICATING IDENTIFICATION DOCUMENTS

(71) Applicant: Servall Data Systems Inc., Calgary (CA)

(72) Inventors: Alberio Bathory-Frota, Calgary (CA); James Marusiak, Calgary (CA); Joel Gallant, Calgary (CA)

(73) Assignee: Servall Data Systems Inc., Calgary (CA)

( * ) Notice: Subject to any disclaimer, the term of this patent is extended or adjusted under 35 U.S.C. 154(b) by 264 days.

(21) Appl. No.: 16/911,946

(22) Filed: Jun. 25, 2020

(65) Prior Publication Data

US 2021/0004581 A1 Jan. 7, 2021

Related U.S. Application Data

(60) Provisional application No. 62/871,026, filed on Jul. 5, 2019.

(51) Int. Cl.
*G06V 30/413* (2022.01)
*G06F 3/041* (2006.01)
(Continued)

(52) U.S. Cl.
CPC ............ *G06V 30/413* (2022.01); *G06F 3/041* (2013.01); *G06V 10/40* (2022.01); *G06V 40/172* (2022.01);
(Continued)

(58) Field of Classification Search
CPC .... G06V 30/413; G06V 10/40; G06V 40/172; G06V 40/40; G06V 30/10;
(Continued)

(56) References Cited

U.S. PATENT DOCUMENTS

| | | | |
|---|---|---|---|
| 5,420,924 A | 5/1995 | Berson | |
| 5,432,864 A | 7/1995 | Lu | |

(Continued)

FOREIGN PATENT DOCUMENTS

| | | | |
|---|---|---|---|
| AU | 2014100797 A4 | 9/2014 | |
| CA | 2434757 A1 | 1/2004 | |
| CN | 104834905 A | 8/2015 | |

OTHER PUBLICATIONS

Revlr Venue, Proficio Inc., "Revlr Venue Security Measures : ID Scanning & Demographics", dated May 15, 2016, downloaded from https://revirvenuestore.com/blogs/news/117093060-revir-venue-security-measures-id-scanning-demographics on Jun. 18, 2020.

(Continued)

*Primary Examiner* — Nasim N Nirjhar
(74) *Attorney, Agent, or Firm* — ATMAC Patent Services Ltd.; Andrew T. MacMillan

(57) ABSTRACT

A document scanner includes an enclosure with a scanning area. A transparent platform in the scanning area allows a user to position a document for authentication. A top camera takes a picture of the top of the document and a bottom camera takes a picture of the bottom under multiple light conditions including UV, IR, and white light. Mirrors reduce the enclosure size and multiple computers within the enclosure share work to process image data and determine document type. Types are searched in order based historically detected types. Barcode data is decoded and image samples are filtered as one of the computers finds a match. Security features are checked for the detected type and fake variants of the detected type are checked. Card information and formatting is validated and face data captured from a face camera and as shown on the document are matched against a database of banned users.

20 Claims, 20 Drawing Sheets

(51) Int. Cl.
*H04N 5/225* (2006.01)
*H04N 5/235* (2006.01)
*H04N 5/247* (2006.01)
*G06V 10/40* (2022.01)
*G06V 40/40* (2022.01)
*G06V 40/16* (2022.01)
*G06V 30/10* (2022.01)

(52) U.S. Cl.
CPC ........... *G06V 40/40* (2022.01); *H04N 5/2253* (2013.01); *H04N 5/2254* (2013.01); *H04N 5/2256* (2013.01); *H04N 5/2354* (2013.01); *H04N 5/247* (2013.01); *G06V 30/10* (2022.01)

(58) Field of Classification Search
CPC ........... G06V 30/1431; G06V 30/1448; G06V 30/414; G06F 3/041; H04N 5/2253; H04N 5/2254; H04N 5/2256; H04N 5/2354; H04N 5/247; H04N 5/23229; H04N 5/2257
See application file for complete search history.

(56) References Cited

U.S. PATENT DOCUMENTS

| | | |
|---|---|---|
| 6,523,741 B1 | 2/2003 | DiMaria |
| 6,679,425 B1 | 1/2004 | Sheppard |
| 6,801,907 B1 | 10/2004 | Zagami |
| 7,983,452 B2 | 7/2011 | Chaney et al. |
| 8,500,009 B2 | 8/2013 | Clapsaddle |
| 8,517,254 B1 | 8/2013 | Cipriano |
| 9,406,067 B1 | 8/2016 | Robinson |
| 9,563,898 B2 | 2/2017 | McMahan |
| 9,576,194 B2 | 2/2017 | Bowers |
| 9,697,650 B2 | 7/2017 | Nakfoor |
| 9,965,751 B1* | 5/2018 | Lattman ............... H04N 1/2034 |
| 10,242,283 B1 | 3/2019 | Jain |
| 10,455,113 B1* | 10/2019 | Fielding ................ B41J 2/2107 |
| 2007/0239549 A1 | 10/2007 | LaFauci et al. |
| 2009/0157515 A1 | 6/2009 | Lafauci |
| 2009/0167492 A1 | 7/2009 | Madafferi et al. |
| 2009/0283582 A1 | 11/2009 | Doan |
| 2014/0291400 A1* | 10/2014 | Olmstead ............. G07G 1/0045 235/440 |
| 2014/0339296 A1* | 11/2014 | McAdams .......... G06F 16/9554 235/375 |
| 2016/0275518 A1* | 9/2016 | Bowles .............. G06V 40/1365 |

OTHER PUBLICATIONS

Intellicheck, "Authentication made simple", website home page, downloaded from https://intellicheck.com on Jun. 18, 2020.

* cited by examiner

APPARATUS, SYSTEM AND METHOD FOR AUTHENTICATING IDENTIFICATION DOCUMENTS

CROSS-REFERENCE TO RELATED APPLICATIONS

This application claims the benefit of priority of U.S. Provisional Application No. 62/871,026 filed Jul. 5, 2019, which is incorporated herein by reference.

BACKGROUND OF THE INVENTION

(1) Field of the Invention

The invention pertains generally to authenticating identification cards (IDs) at venues such as bars, clubs, and other business establishments that serve alcoholic beverages or have other restricted access requirements. More specifically, the invention relates to an apparatuses, systems, and methods for detecting fake ID cards and banned persons at points of entry to a restricted area.

(2) Description of the Related Art

Licensed venues serve alcohol to patrons as a component of the entertainment provided at such venues. A condition of a liquor license is that no alcohol may be served to underaged patrons within the premises. The specific cut-off age varies region to region but is typically in the range of 18 years of age to 21 years of age. Most licensed venues devote significant resources to screen patrons prior to entry and prevent access to the venue by underaged patrons.

The most common way to verify age is to ask potential patrons for some form of government-issued photo identification document such as a driver's license or passport. Staff members visually compare the photo on the document to the face of the person presenting the card. Information from the documentation may also be entered into a computer system for verification purposes against an internal or publicly accessible database.

There are a number of problems with this way of verifying patron age. Patrons often present false identification documents. High-quality fake driver's license or similar fake ID documents can be ordered online and delivered via mail. Typically these IDs are printed by sophisticated printers based in foreign jurisdictions where the counterfeiter is not exposed to any legal liability. It is very difficult for an untrained individual such as a typical staff member at a licensed entertainment venue to spot these fakes. Unlike in a border control situation, staff members at licensed venues are not trained in document authentication and do not have the luxury of minutes of time with each patron to verify documents and identity. A popular licensed venue may have several hundreds or thousands of patrons pass through its doors. Long lines of people waiting for document validation outside a venue gives a poor experience and discourages patrons from attending or returning.

BRIEF SUMMARY OF THE INVENTION

According to an exemplary embodiment of the invention there is disclosed an apparatus for authenticating documents. The apparatus includes an enclosure having an opening providing access to a document scanning area within the enclosure. A document platform is mounted within the document scanning area and formed of a transparent material upon which a document to be authenticated is placed. A top mirror is mounted within the enclosure above the document platform. A top camera is mounted within the enclosure and having a lens directed toward a reflective surface of the top mirror. A bottom mirror is mounted within the enclosure below the document platform. A bottom camera is mounted within the enclosure and having a lens directed toward a reflective surface of the bottom mirror. Relative positions and angles of the top camera and top mirror are such that the top camera has a field of view of a top side of the document platform and an optical axis perpendicular to the top side of the document platform. Relative positions and angles of the bottom camera and bottom mirror are such that the bottom camera has a field of view of a bottom side of the document platform and an optical axis perpendicular to the bottom side of the document platform.

In an advantageous embodiment, a document scanner includes an enclosure with a scanning area. A transparent platform in the scanning area allows a user to position a document for authentication. A top camera takes a picture of the top of the document and a bottom camera takes a picture of the bottom under multiple light conditions including UV, IR, and white light. Mirrors reduce the enclosure size and multiple computers within the enclosure share work to process image data and determine document type. Types are searched in order based historically detected types. Barcode data is decoded and image samples are filtered as one of the computers finds a match. Security features are checked for the detected type and fake variants of the detected type are checked. Card information and formatting is validated and face data captured from a face camera and as shown on the document are matched against a database of banned users.

These and other advantages and embodiments of the present invention will no doubt become apparent to those of ordinary skill in the art after reading the following detailed description of preferred embodiments illustrated in the various figures and drawings.

BRIEF DESCRIPTION OF THE DRAWINGS

The invention will be described in greater detail with reference to the accompanying drawings which represent preferred embodiments thereof.

DETAILED DESCRIPTION

Figure 1:
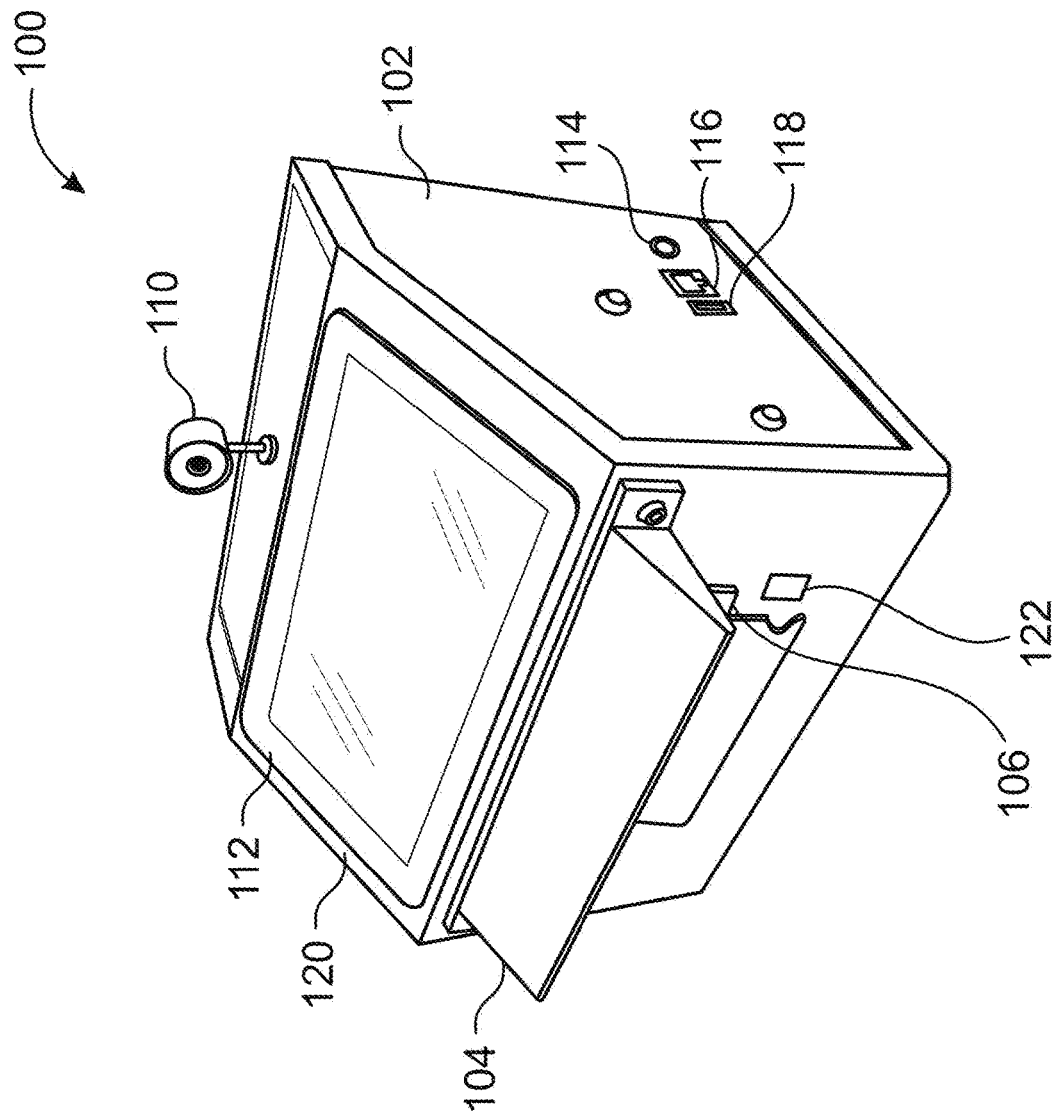
FIG. 1 shows a perspective view of the document scanner for authenticating identification documents and patrons according to an exemplary embodiment.

FIG. 1 to FIG. 4 illustrate various angles of a document scanner 100 for authenticating identification documents and patrons according to an exemplary embodiment. FIG. 1 shows a perspective view of the document scanner 100. In some useful applications, the document scanner 100 is located outside an entrance door or other point of access of a venue such as a bar or club that serves alcoholic beverages. The document scanner 100 includes an enclosure 102, a light screen 104, and a front opening 106 providing a document scanning area 108 (see area 108 illustrated more clearly in FIG. 5). The light screen 104 helps ensure that the lighting conditions within the document scanning area 108 are not adversely affected by overhead lights external to the document scanner 100. Likewise, the light screen 104 helps prevents ultraviolet and other types of light illuminating the document scanning area 108 within the enclosure 102 from shining into patrons' or other staff members' eyes.

In this embodiment, the document scanner further includes a face camera 110 which may be implemented as a high-definition digital web camera mounted on a top of the enclosure 102 and facing toward where a patron's face will be located for capturing a digital image of the patron's face. The face camera 110 is rotatable in this embodiment to be better directed toward different patron heights and directions depending on the orientation and placement of the document scanner and pedestal positions. A touch screen 112 is mounted on the outer surface of the enclosure 102 and provides a user interface (UI) for a user of the document scanner 100 such as a staff member of the venue who is responsible for authenticating identification (ID) documents by patrons prior to granting patrons access to the venue. A reset button 114 along with one or more communications ports such as an Ethernet port 116 and a universal serial (USB) port 118 are located on a side or back of the enclosure 102.

Figure 2:
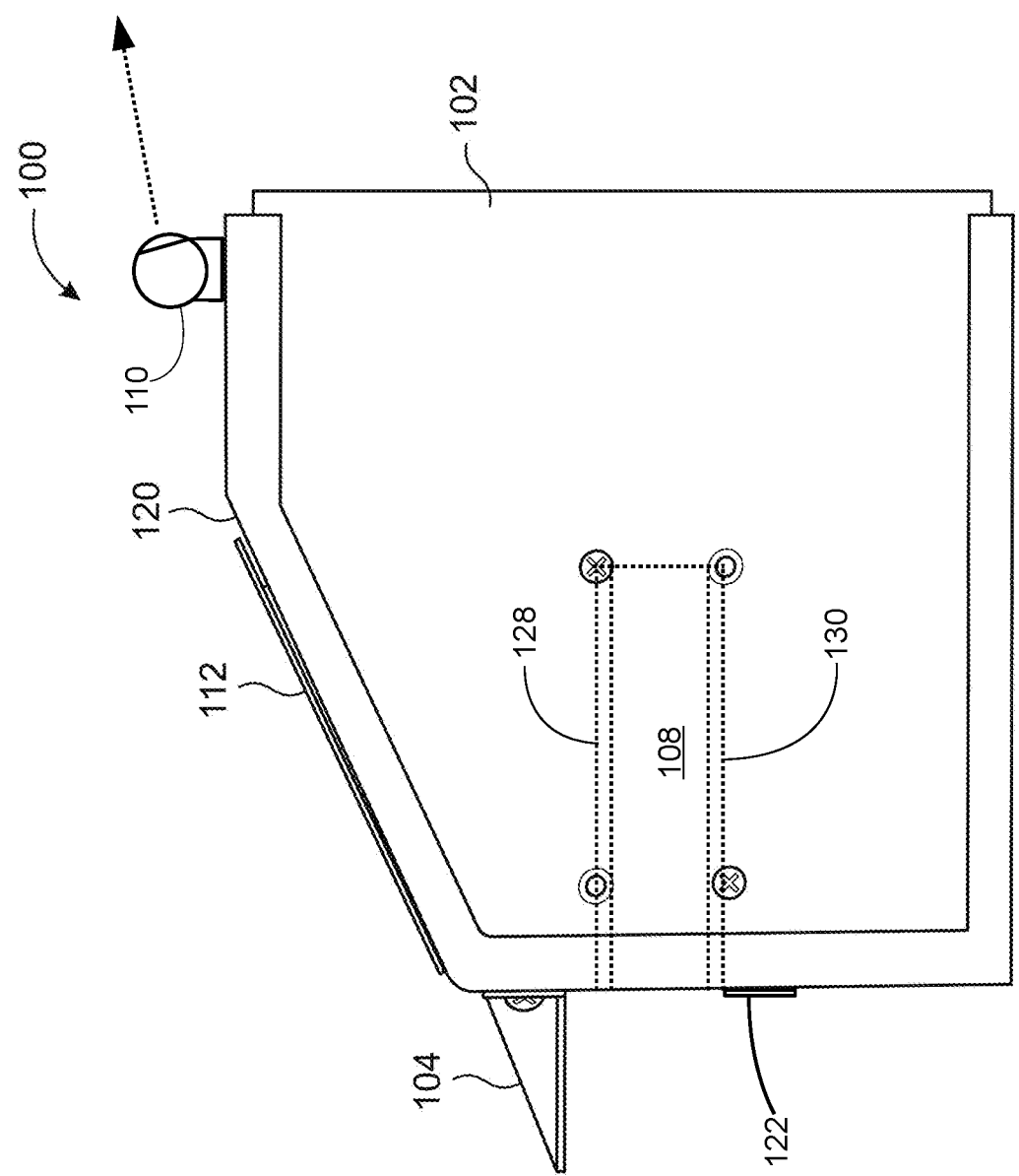
FIG. 2 illustrates a side view of the document scanner of FIG. 1.

FIG. 2 illustrates a side view of the document scanner 100 of FIG. 1. As illustrated, the document scanner 100 includes an angled top surface 120 for supporting the touchscreen 112. The light screen 104 extends over the front opening 106 providing the document scanning area 108, and the face camera 110 in this embodiment is directed toward an opposing side away from the side of the enclosure 102 providing the front opening 106 to the document scanning area 108. A radio frequency identification (RFID) reader 122 is mounted on the front side of the enclosure 102 under the opening 106 to the document scanning area 108. Within the document scanner 100, the scanning area is formed by a top platform 128 and a bottom platform 130.

Figure 3:
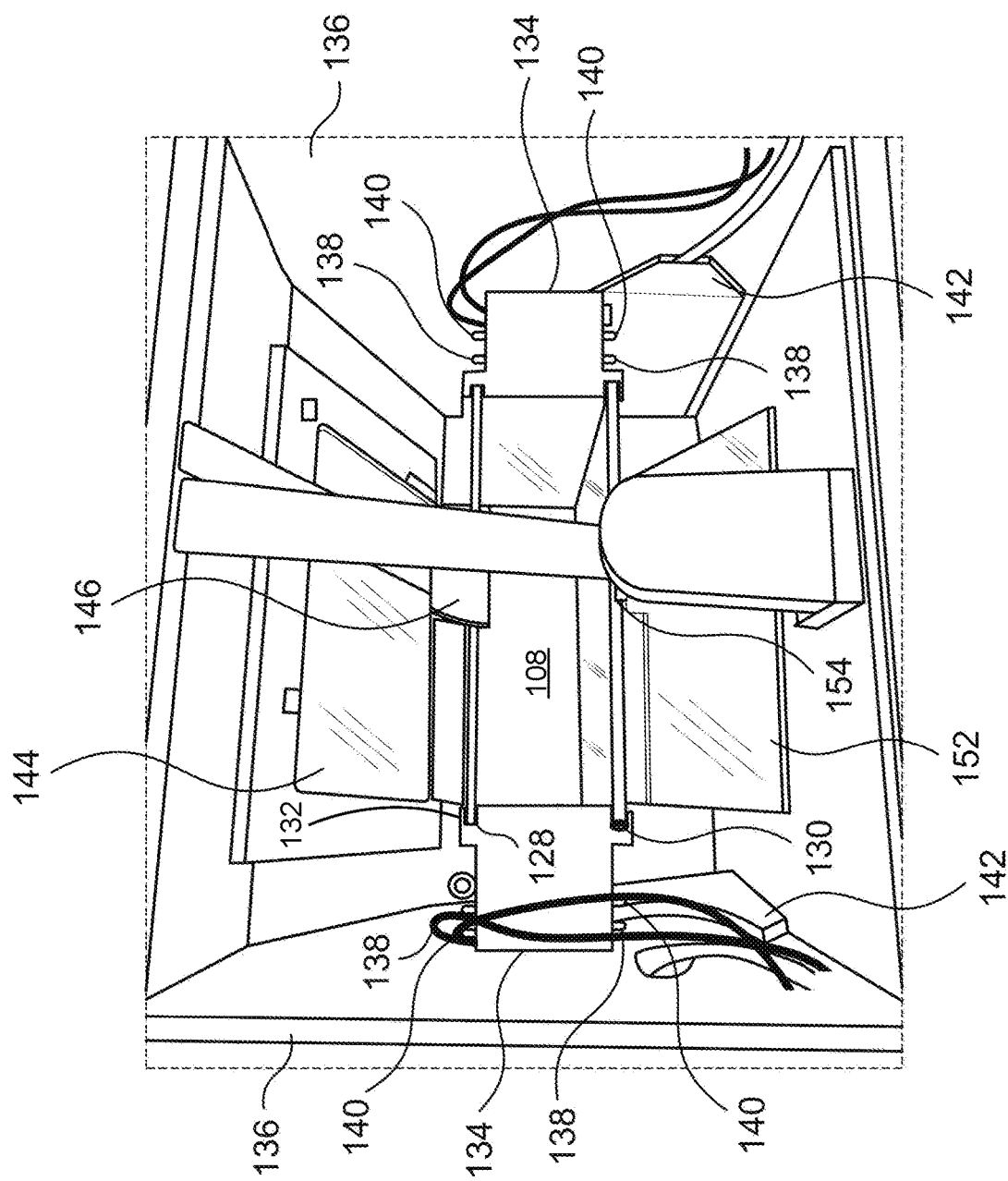
FIG. 3 illustrates a back view of the document scanner of FIG. 1 with a vertical back-panel and mid-panel both removed to show interior components within the enclosure.

FIG. 3 illustrates a back view of the document scanner 100 of FIG. 1 with a vertical back-panel 124 and mid-panel 126 both removed (see FIG. 5 for a cross sectional side view better illustrating the vertical back-panel 124 and mid-panel 126 when installed) to show interior components within the enclosure 102. In this embodiment, the document scanning area 108 is formed by the top platform 128 mounted approximately five centimetres above the bottom platform 130. The space intermediate the two platforms 128, 130 forms the document scanning area 108 and can be accessed by users from the front opening 106. The top and bottom platforms 128, 130 are parallel flat plates made of transparent material such as glass or clear plastic and are mounted and held in position within receiver tracks 132 on light brackets 134 mounted to the inside surfaces of the enclosure 102 on the opposing side walls 136. The light brackets 134 include infrared light emitting diodes (LEDs) 138 and ultraviolet LEDs 140. Adjacent the light brackets 134 are white light diffusers 142 mounted to the side walls 136. A top mirror 144 and a digital top camera 146 are mounted within the enclosure 102 and positioned to allow the top camera 146 to take pictures of a top side 148 of a document 150 (see FIG. 4) to be authenticated placed on the bottom platform 130 of the document scanning area 108. Likewise, a bottom mirror 152 and a digital bottom camera 154 are mounted within the enclosure 102 and positioned to allow the bottom camera 154 to take pictures of a bottom side 156 of the document 150 placed on the bottom platform 130 of the document scanning area 108.

Figure 4:
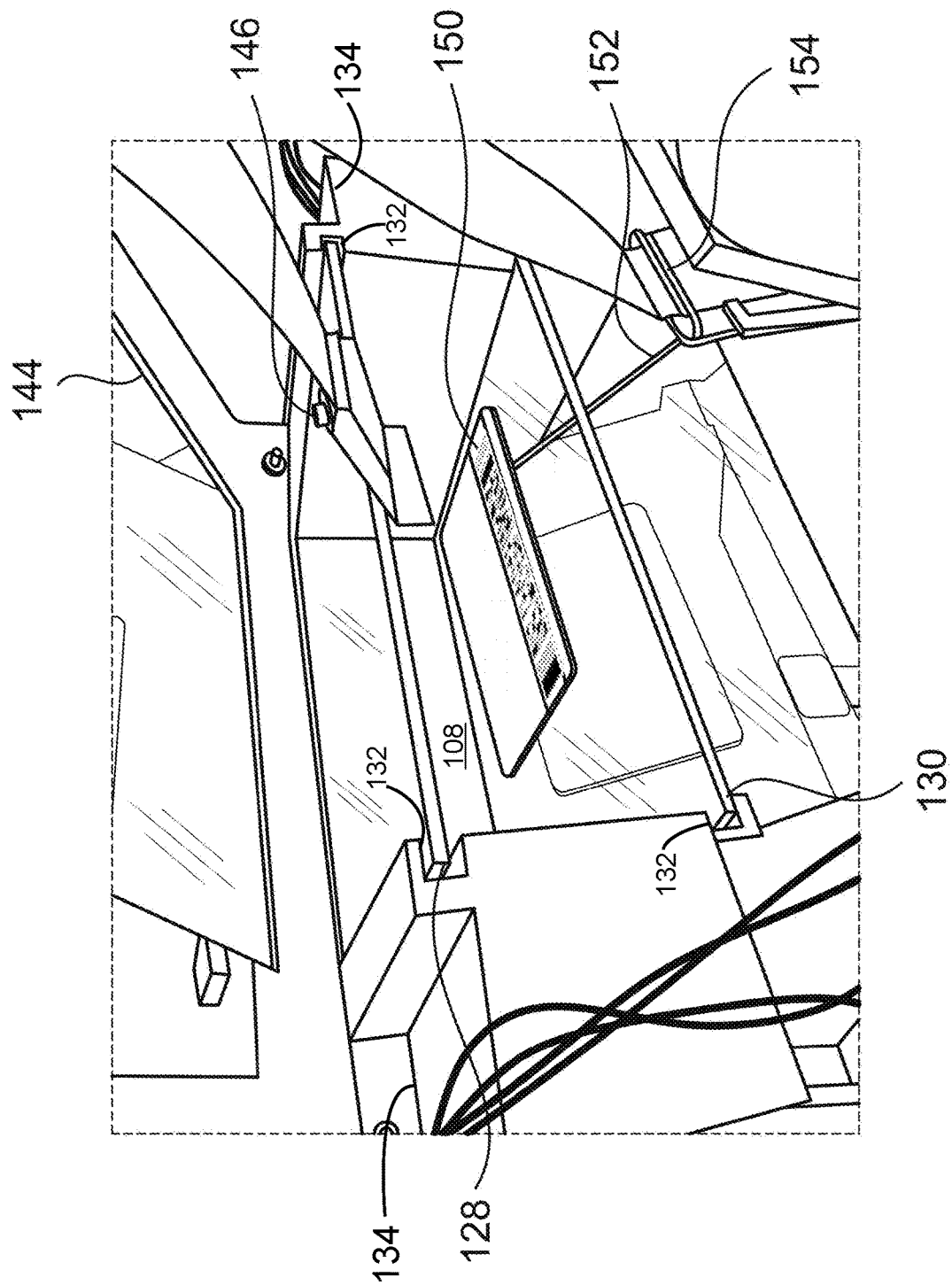
FIG. 4 illustrates a close-up perspective back view of the document scanner similar to FIG. 3 showing a document placed on the bottom platform of the document scanning area.

FIG. 4 illustrates a close-up perspective back view of the document scanner 100 with the back-panel 124 and the mid-panel 126 removed as illustrated in FIG. 3 showing a document 150, being a driver's license in this example, placed on the bottom platform 130 of the document scanning area 108. The bottom platform 130 is the same size as the maximum document size that will ever need to be authenticated, which, in this embodiment, is the size of a biography data page of a passport.

Figure 5:
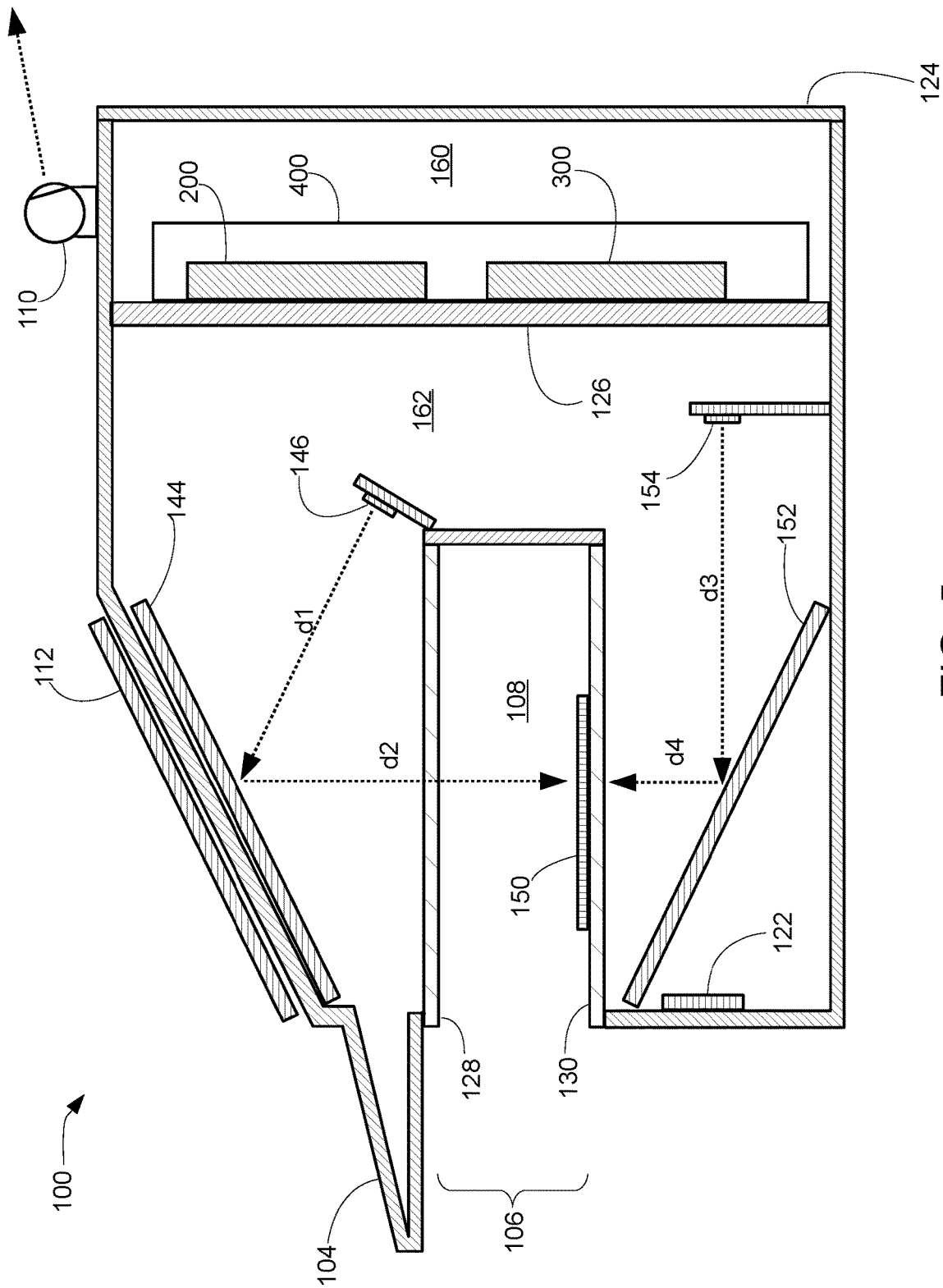
FIG. 5 illustrates a cross section of the document scanner of FIG. 1.

FIG. 5 illustrates a cross section of the document scanner 100 of FIG. 1. As illustrated, the top mirror 144 and the top camera 146 are configured with angles and mounting positions such that the optical axis of the top camera 146 is directed to the center of the document scanning area 108 and is perpendicular to the flat surface of the top platform 128 (and perpendicular to the flat surface of the bottom scanning platform 130, the bottom platform 130 being parallel to the top platform 128). Likewise, the bottom mirror 152 and the bottom camera 154 are configured with angles and mounting positions such that the optical axis of the bottom camera 154 is directed to the center of the document scanning area 108 and is perpendicular to the flat surface of the bottom platform 130.

Taking the top camera 146 and top mirror 144 as an example, because the light from the document scanning area 108 bounces off the top mirror 144 before reaching the lens of the top camera 146, the distance the light travels (d1+d2) is sufficient to ensure the field of view of the top camera 146 includes the full document scanning area 108. In this way, the top camera 146 can capture a complete top-side image of a document 150 to be authenticated even when the document 150 covers the entire bottom platform 130 such as when a full passport page (or other maximum sized document 150) is placed on the bottom platform 130 for authentication. Similarly, for the bottom camera 154 and bottom mirror 152, because the light from the document scanning area 108 bounces off the bottom mirror 152 before reaching the lens of the bottom camera 154, the distance the light travels (d3+d4) is sufficient to ensure the field of view of the bottom camera 154 includes the full document scanning area 108. In this way, the bottom camera 154 can capture a complete bottom-side image of the document 150 to be authenticated even when the document 150 completely covers the bottom platform 130. The vertical height of the enclosure 102 in this embodiment is thereby reduced by utilizing the mirrors 144, 152 to effectively position the cameras 146, 154 the required distance (d1+d2/d3+d4) away from the bottom platform 130.

The vertical back-panel 124 and mid-panel 126 when installed create an enclosed electronics area 160. In this embodiment, the back panel 124 is removable for accessing and servicing electrical components within the electronics area 160. Examples of electrical components include a primary computer 200 and a secondary computer 300 each mounted along with a battery 400 to the mid-panel 126. In the event there are problems with the optical alignment of the cameras 146, 154 and/or mirrors 144, 152, for example, the mid-panel 126 along with the electrical components mounted thereupon are removable for accessing an optical area 162 within the enclosure 102.

Figure 6:
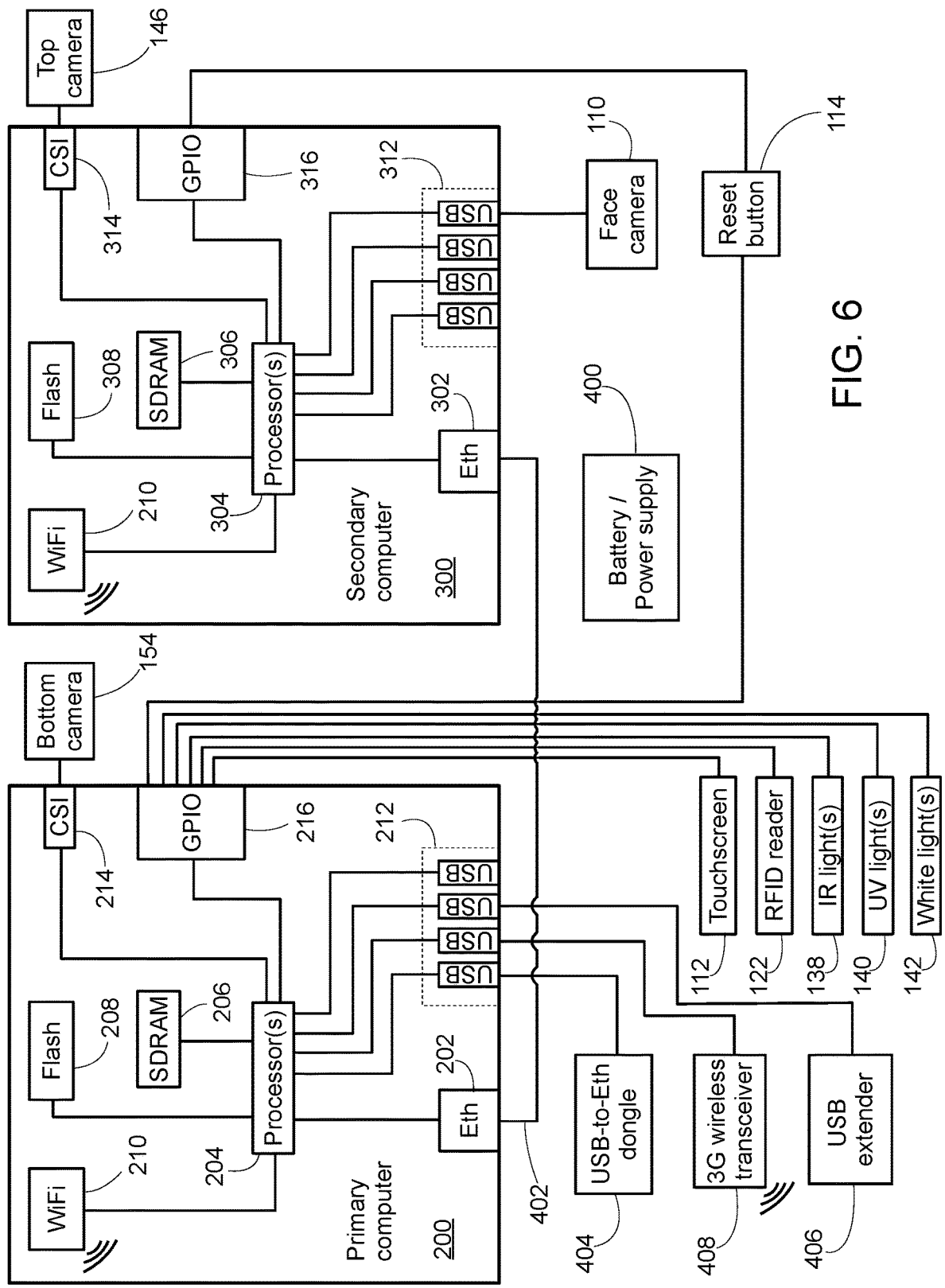
FIG. 6 illustrates a block diagram of electrical components within the document scanner of FIG. 1 according to an exemplary embodiment.

FIG. 6 illustrates a block diagram of electrical components within the document scanner 100 of FIG. 1 according to an exemplary embodiment. As illustrated, the document scanner 100 in this embodiment includes a primary computer 200 coupled to a secondary computer 300 by an internal network connection being a cable 402 in this embodiment. The primary computer 200 includes a network interface terminating in an Ethernet port 202, which is coupled by an Ethernet crossover cable 402 to a corresponding network interface terminating in an Ethernet port 302 on the secondary computer 300.

In this embodiment, the primary computer 200 and the second computer 300 are similar to one another and may each be implemented by an embedded computer such as a Raspberry Pi™ or the like. For ease of description, the reference numerals for the similar components of the two computers 200, 300 have corresponding numbers where the series of numbers in the two-hundreds indicates the component is for the primary computer 200 and the series of numbers in the three-hundreds indicates the component is for the secondary computer 300. Both computers 200, 300 include a one or more processors 204, 304, a variety of storage devices such as SDRAM 206, 306 and flash memory 208, 308, a plurality of network and communication interfaces such as the Ethernet ports 202, 302, wireless interfaces 210, 310, and universal serial devices (USBs) ports 212, 312. Other input/output ports include a camera serial interface (CSI) port 214, 314 for coupling to one of the cameras 144, 146 and a collection of general-purpose input/output ports (GPIO) 216, 316 for coupling to various other components external to the computers 200, 300.

Concerning the other electrical components of the document scanner 100, in this embodiment the bottom camera 154 is coupled to the primary computer 200 and the top camera 146 is coupled to the secondary computer 300. The touchscreen 112 is coupled to the GPIO ports 216 of the primary computer 200, and a soft reset button 114 is coupled to the GPIO ports 216, 346 of both the primary and secondary computers 200, 300. A USB-to-Ethernet dongle 404 is coupled to a USB port 212 of the primary computer 200 and provides users with an Ethernet port 116 mounted to and accessible from external to the enclosure 102. Likewise, a USB extender 406 is coupled to a USB port 212 of the primary computer 200 and provides users with a USB port 118 mounted to and accessible outside the enclosure 102. A wireless mobile telecommunications transceiver 408 is coupled to a USB port 212 of the primary computer 200 and allows wireless connection to a mobile cellular network such as a 3G, 4G or 5G mobile network. The face camera 110 is coupled to a USB port 312 of the secondary computer 300 and one or more batteries 400 and/or power supplies provide electrical power.

Figure 7:
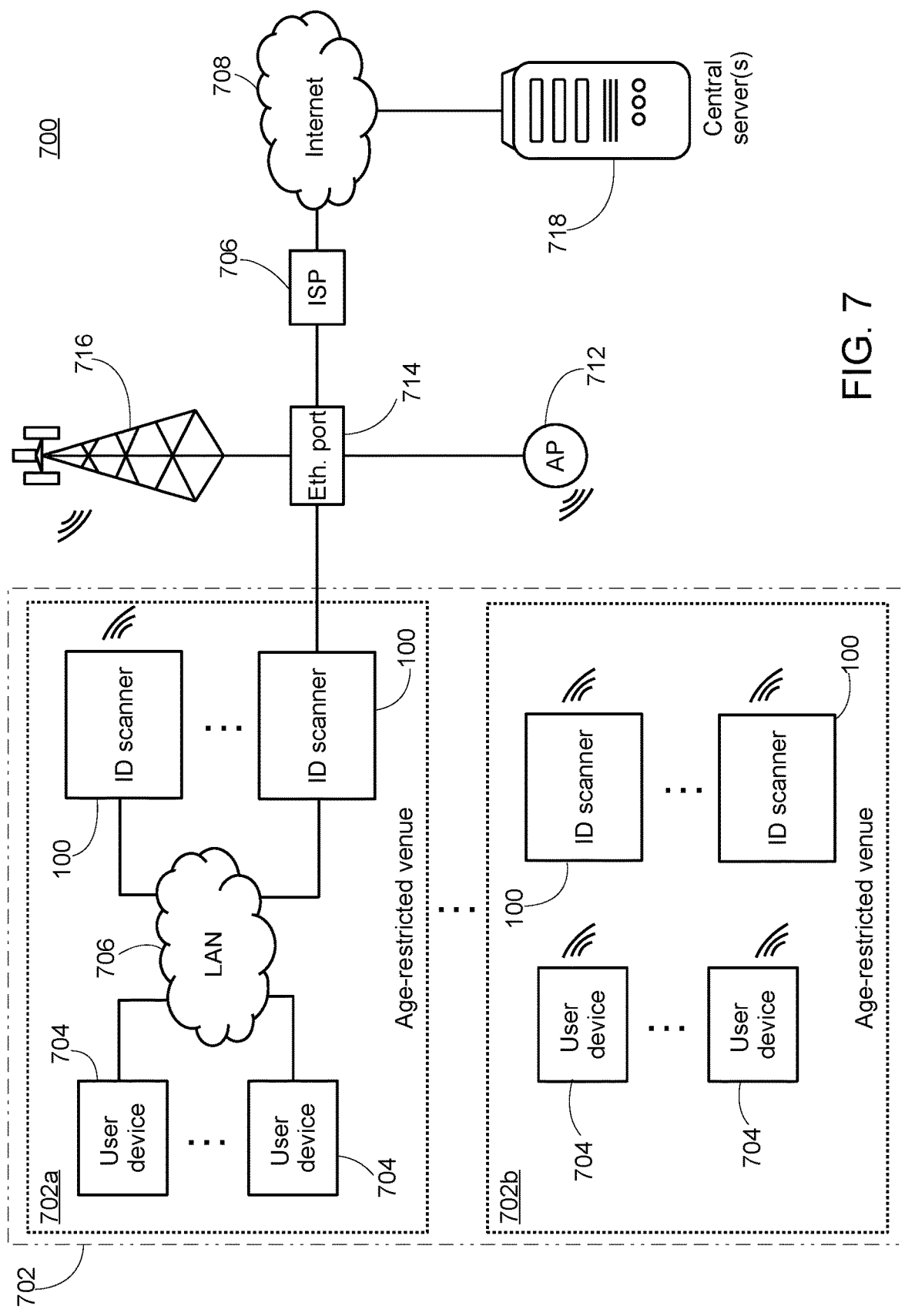
FIG. 7 illustrates a block diagram of a document scanning system employing a plurality of document scanners of FIG. 1 according to an exemplary embodiment.

FIG. 7 illustrates a block diagram of a document scanning system 700 employing a plurality of document scanners 100 of FIG. 1 according to an exemplary embodiment. The system 700 includes a one or more document scanners 100 at each of a plurality of age-restricted venues 702 such as bars or clubs serving alcohol. Each document scanner 100 is positioned at a door or other ingress point where new patrons enter the venue 702. A plurality of user devices 704 such as mobile phones and tablet computers carried by staff at each venue 702 are coupled to the document scanners 100 at that venue 702.

In some applications such as at the first venue 702a, the user devices 704 are coupled to the document scanners 100 via a local area network (LAN) 706 provided on premise either wired via the Ethernet/USB ports 116, 118 of each document scanner 100 or wireless via the Wi-Fi interfaces 210, 310 provided by one of the computers 200, 300 within the document scanner 100. In other applications such as the second venue 702b illustrated in FIG. 7, the user devices 704 at the venue 702b are coupled to the document scanner 100 via an external network such as a wide area network provided external to the venue 702b. Examples of the wide area network include the Internet 708 provided by an Internet service provider (ISP) 710, which may accessed in any suitable way such as via Wi-Fi access points (APs) 712, Ethernet ports 714, cellular data stations 716, etc.

As shown, the system 700 further includes one or more central servers 718, which manage various data utilized by the document scanners 100 including banned patron lists as well as image samples and models for valid and fake documents 150. In some embodiments, each document scanner 100 downloads data including but not limited to image samples of valid and fake variants, documents formatting information, and banned and VIP patrons from the central server(s) 718 prior to the document scanner 100 being utilized for service. In this way, the required data for authenticating documents 150 and ensuring security at the venues 702 is cached within the memory 206, 208, 306, 308 of the document scanner devices 100 themselves and speed and reliability is increased even if network connections go down or are simply not available or utilized while the document scanners 100 are being utilized to check new patrons and their documents 150 for entry.

Figure 8:
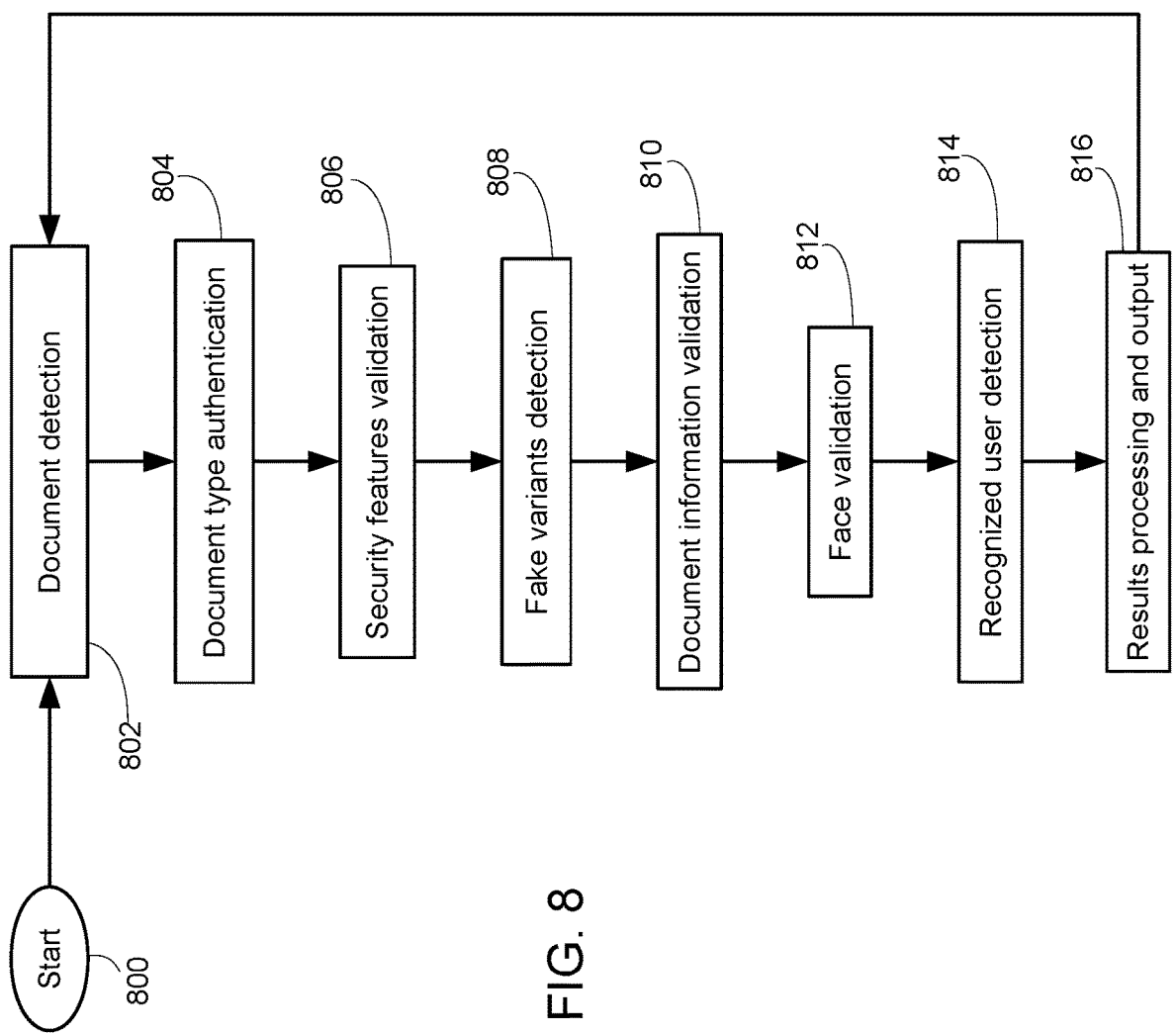
FIG. 8 shows a flowchart of a method of authenticating documents according to an exemplary embodiment.

FIG. 8 shows a flowchart of a method of authenticating documents 150 according to an exemplary embodiment. The steps of FIG. 8 may be performed by the primary and secondary computers 200, 300 of the document scanner 100 illustrated in FIG. 6, for example. The steps of the flowchart are not restricted to the exact order shown, and, in other configurations, shown steps may be omitted or other intermediate steps added.

The process begins at step 800 when the document scanner 100 enters regular document scanning operations. In some embodiments, this occurs immediately upon power up. In other embodiments, regular scanning operations are entered upon a user activating this mode utilizing the touchscreen 112. Any desired starting trigger may be employed in other embodiments.

At step 802, the document scanner 100 detects a document 150 to be authenticated present within the document scanning area 108. This step involves ensuring that there is a document 150 present and that the document scanner 100 has clear pictures of the top and bottom sides of the document 150 for processing.

At step 804, the document scanner 100 authenticates the type of the document 150 present within the document scanning area 108. This step involves determining that the document 150 is one of a plurality of known document types supported by the document scanner 100.

At step 806, the document scanner 100 validates security features of the document 150. This step involves checking for features of certain types of documents 150 that are present or that change under different lighting conditions. Likewise, RFID data may be read and verified from the document as another security feature at this step.

At step 808, the document scanner 100 detects whether the document 150 matches a fake variant of the particular type of document 150. This step involves looking for characteristics that are present in known fake cards of the particular document type. For example, the document scanner 100 may check the barcode for known characteristics of fake documents such as having a bad encoding or not following a proper algorithm for data encoding as utilized by the jurisdiction of the document.

At step 810, the document scanner 100 validates information on the document 150. This step involves performing optical character recognition of text of the document and matching or otherwise validating it to encoded information in barcode(s) on the document and ensuring text formatting is proper for the particular document type.

At step 812, the document scanner 100 validates the face of the cardholder. This step involves matching an image of the cardholder's face captured by the face camera 110 with a previously stored image of the cardholder such as stored on the central servers 718 and/or the face of the cardholder present on the document 150.

At step 814, the document scanner 100 detects recognized users. This step involves looking for both known bad patrons such as patrons on a banned list and/or known good patrons such as patrons on a very important person (VIP) list.

At step 816, the document scanner 100 processes and outputs results. This step involves displaying output on the touchscreen 112 informing a staff member of whether or not the patron and their associated document 150 have passed the verification process and can be permitted entry to the venue 702. The process then repeats by returning to step 802 to detect a next document 150 placed within the document scanning area 108.

Figure 9:
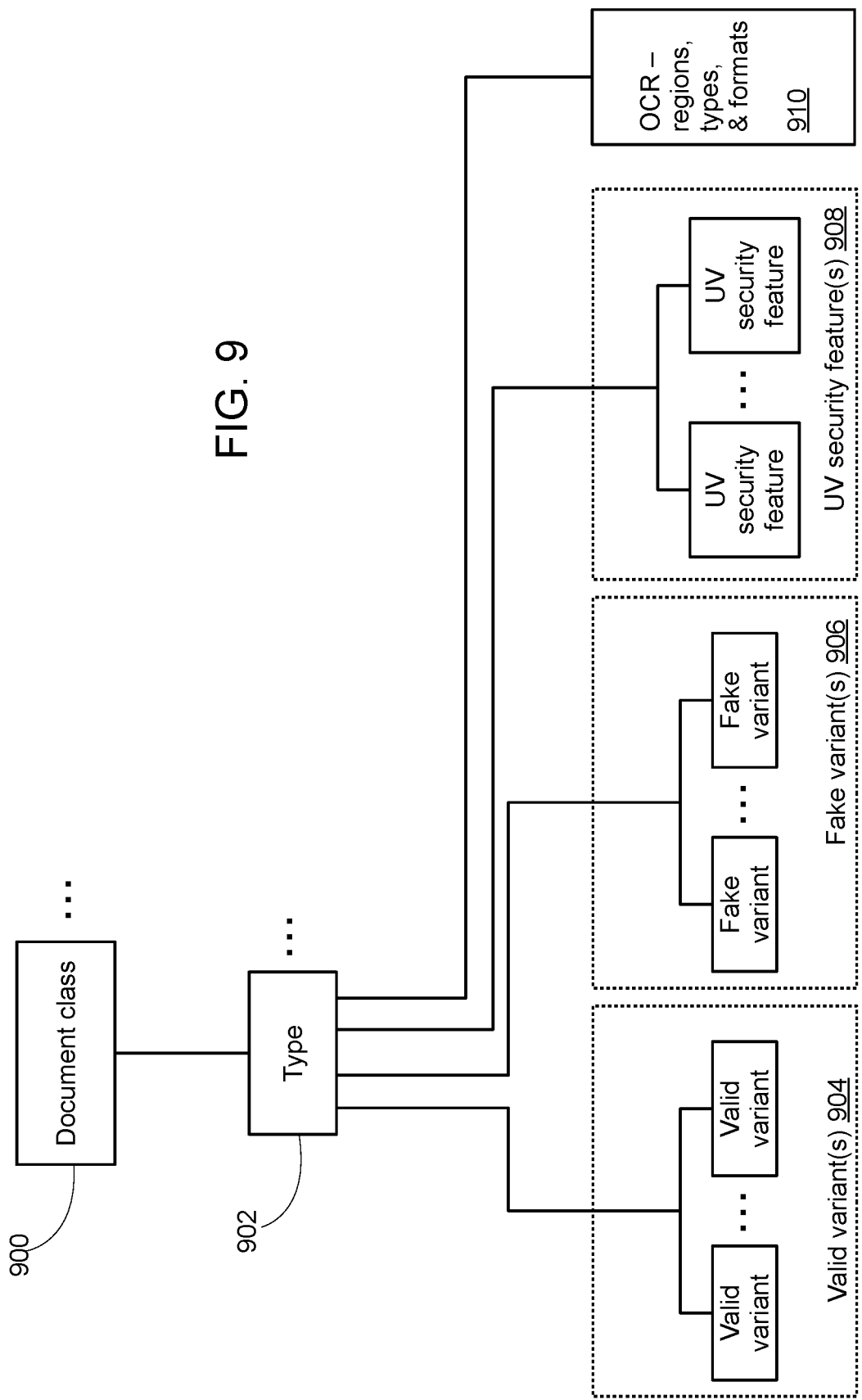
FIG. 9 illustrates a block diagram illustrating the types of information stored in the memory of the document scanner and/or central servers that are associated with each of a plurality of document classes according to an exemplary embodiment.

FIG. 9 illustrates a block diagram illustrating the types of information stored in the memory 206, 208, 306, 308 of the document scanner 100 and/or central servers 718 that are associated with each of a plurality of document classes 900 according to an exemplary embodiment. In this embodiment, document classes 900 represent the high-level class of documents 150 that can be authenticated by the document scanner 100. Examples of document classes 900 include: Canadian passport, United States passport, Alberta driver's license, California driver's license, etc. In some embodiments, the document scanner 100 includes image samples and other associated data that are only found on a particular document class 900. For example, the logo, symbol, crest, and/or name of a state or province will only be found on identification documents of certain classes such as driver's licenses and identification cards. Likewise, the phrase "driver's license" or "operator's license" will only be found on driver's licenses. Image samples and data are stored at the document class 900 level when, if found on a particular document, the document is thereby known to belong to a particular class 900.

Linked to each document class 900 are a number of types 902. Each type 902 includes image samples and associated data for a particular type 902 of the class 900. For instance, the state of California has made changes to their driver's licenses over the years and each year's license is therefore a different type 902 of the California driver's license class 900. Differences that may be recognized to identify the type 902 include a plurality of image samples that would only be present on a particular year's driver's license, for example. Likewise, passports and other documents from a same country or other government entity also have different characteristics. Image samples are stored for each type 902 and other data may indicate other characteristics. For example, a logo on a particular year's drivers license may be moved to a different position. Likewise, text may be changed to have a different phrasing or content on different types 900 of the same document class 900.

For each type 902, there are yet still other data associated therewith in this embodiment. For one, each type 902 may have more than one valid variation 904 within the same type 902 of document class 900. These variations are referred herein as "valid variants" 904 and represent differences that are caused because of different printers that are used to print out valid documents 150 of a same type 902. For instance, a single state in the United States may have a set of printers (e.g., nine printers) that print valid driver's licenses for the state. Each of these printers may have slightly differing outputs such that valid license documents 150 printed on a first of the printers have one or more differing characteristics than valid license documents 150 printed on a second of the printers. In effect, each printer has output that unintentionally has a fingerprint or other unique characteristics that can be detected and recognized in order to identify the printer on which it was printed. Examples of valid variants 904 include different apparent ink darkness, colors, angles of lines, margins, and pixel sizes, to name but a few examples. Image samples of portions of the document 150 having these variations and associated data such as positions where they are found on the document are stored as valid variants 904.

Similar to valid variants 904, each type of document type 902 may also include any number of fake variants 906. Fake variants 906 are like valid variants 904 in that they represent differences and unique characteristics of the actual printer utilized to print the document 150; however, unlike valid variants 904, the fake variants 906 are only present on known fake documents 150 printed on one or more unauthorized printers. Just like how each state has a limited number of printers for printing valid licenses 150, most high-quality fakes are printed from a limited set number of fake ID printers located overseas. These printers have unique characteristics that can be detected and recognized in the same way valid variants can be detected 904. Furthermore, fake variants 906 are also generated from templates designed by the document forgers and these templates also can have errors or other minor variations from valid documents that can be directly detected and recognized. Image samples of portions of the document 150 having these variations and associated data such as positions where they are found on the document 150 are stored as fake variants 906.

Each type 902 of document 150 can also include any number of security features 908. The security features 908 may be features that are only apparent under predetermined light conditions. Common security features include image elements that are only present under ultraviolet light. Image samples of portions of the document 150 having these features and associated data such as type of light and positions where they should be found on the document 150 are stored as security features 908.

Each type 902 of document 150 can also include OCR data 910 such as regions where text is found, types of text, and formats of said text. Examples of text include birthdays, names, hair colour, card information, and other details, etc.

Figure 10:
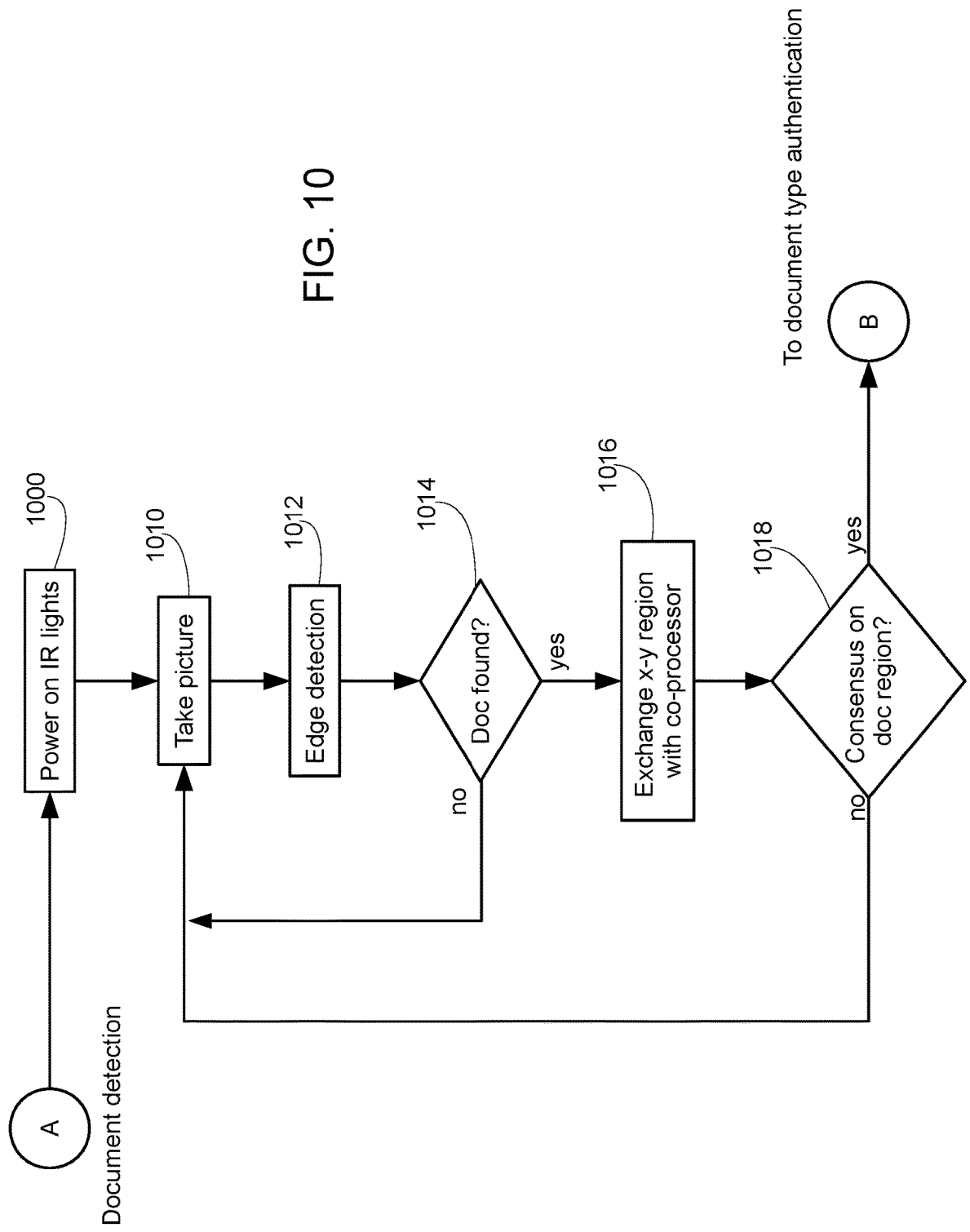
FIG. 10 shows a flowchart of a method of performing the document detection step of FIG. 8 according to an exemplary embodiment.

FIG. 10 shows a flowchart of a method of performing the document detection step 802 of FIG. 8 according to an exemplary embodiment. The steps of FIG. 10 may be performed by the primary and secondary computers 200, 300 of the document scanner 100 illustrated in FIG. 6, for example. The steps of the flowchart are not restricted to the exact order shown, and, in other configurations, shown steps may be omitted or other intermediate steps added.

The document detection process starts at node "A" in this example. This may occur when the document scanner 100 is turned on and enters a normal scanning mode of operations utilized for performing document and patron authentication.

At step 1000, the primary computer 200 turns on the infrared (IR) lights 138 within the enclosure 102 thereby illuminating the document scanning area 108 with IR light.

At step 1010, both the primary computer 200 and the secondary computer 300 control their respective cameras 154, 146 in order to take pictures focused generally on the bottom platform 130 within the document scanning area 108. In this embodiment, image data from the top camera 146 is received by the secondary computer 300 and the image data from the bottom camera 154 is received by the primary computer 200.

At step 1012, the two computers 200, 300 perform edge detection on their respective image data received at step 1010 in order to determine whether the captured image data includes a document 150 placed on the bottom platform 130 of the document scanning area 108. The edge detection may involve looking for a line such as a side edge of a document 150 present on the bottom platform 130 that would not occur if there was no document 150. In some embodiments, both the primary computer 200 and the secondary computer 300 perform edge detection to determine a x-y coordinates representing a boundary of the document 150 as positioned on the bottom platform 130.

At step 1014, each computer 200, 300 determines whether there was a document 150 found based on the results at step 1012. If no edges are found then this means there was no document 150 present in the image data; the image data is therefore discarded and control returns to step 1010 to take another picture. Alternatively, if a document 150 was found in the image data, control proceeds to step 1016.

At step 1016, the computers 200, 300 exchange the x-y region of the document 150 as detected in their respective image data. In some embodiments, the secondary computer 300 passes the x-y region of the document 150 as seen in the image data of the top camera 146 to the primary computer 200 and the primary computer 200 passes the x-y region of the document 150 as seen in the image data of the bottom camera 154 to the secondary computer 300.

At step 1018, the computers 200, 300 determine whether there is a consensus on the document regions. A consensus will be found if the x-y positions of the document 150 in both sets of image data (as captured from the top camera 146 and the bottom camera 154) show the boundary of the document 150 at similar positions. If the x-y positions of the document 150 match within a predetermined threshold, control proceeds to node "B", which corresponds to the start of the document type authentication process 804. Alternatively, if the x-y positions of the document do not match within the predetermined threshold, this means the top camera 146 and the bottom camera 154 captured the document 150 at different positions. Both the primary computer 200 and the secondary computer 300 are independent in this embodiment and it could be that they control the cameras 146, 154 to take pictures at different times. If the document 150 is in motion, i.e., either being placed or removed by a staff member, there may not be consensus on the document region. In this case, control returns to step 1010 to take another picture and try again. As soon as the document 150 is stationary on the bottom platform 130 of the document scanning area 108, the two computers 200, 300 will reach a consensus on the x-y positions and control will then proceed to document authentication 804.

Figure 11:
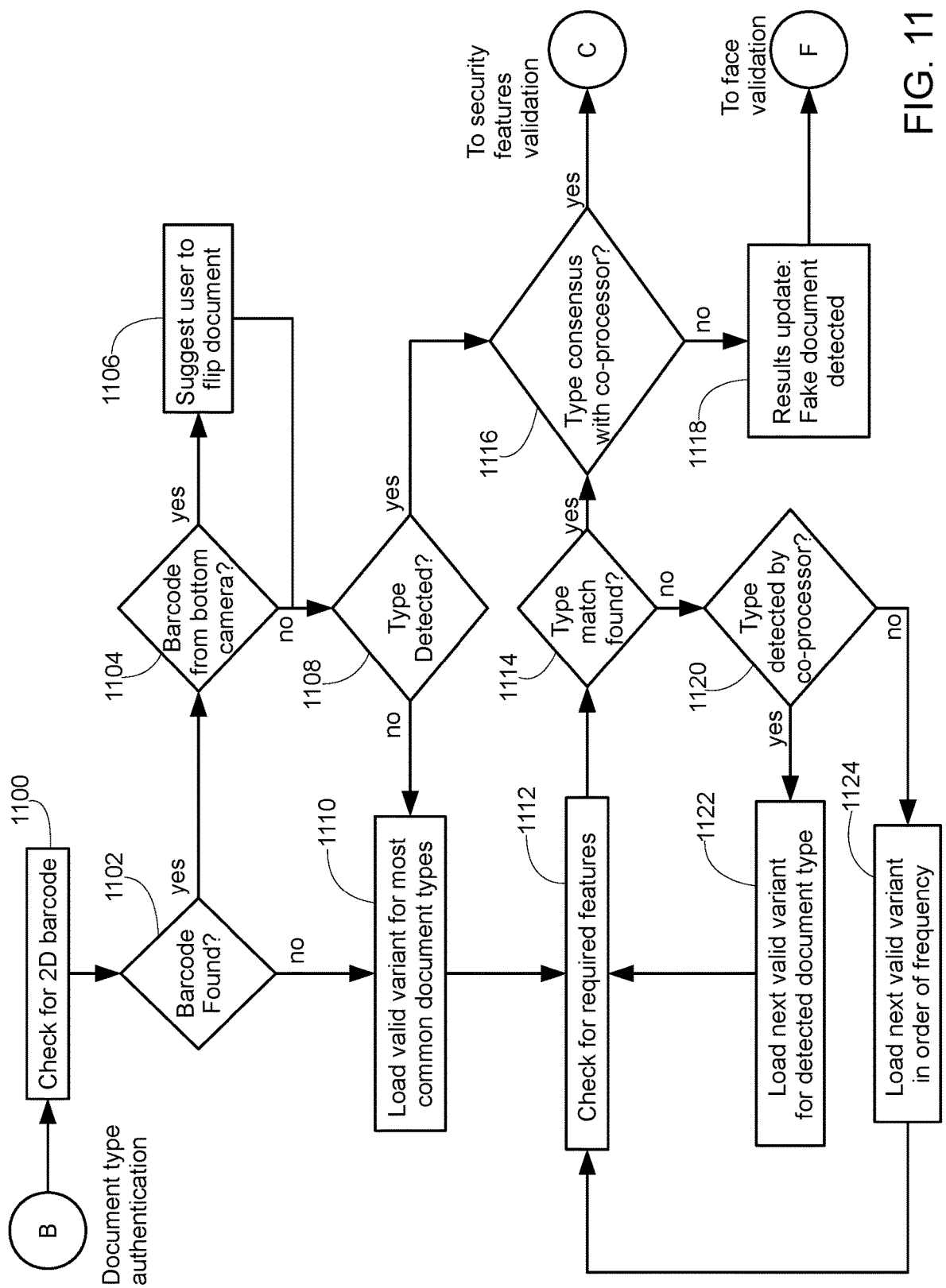
FIG. 11 shows a flowchart of a method of performing the document type authentication step of FIG. 8 according to an exemplary embodiment.

FIG. 11 shows a flowchart of a method of performing the document type authentication step 804 of FIG. 8 according to an exemplary embodiment. The steps of FIG. 11 may be performed by the primary and secondary computers 200, 300 of the document scanner 100 illustrated in FIG. 6, for example. The steps of the flowchart are not restricted to the exact order shown, and, in other configurations, shown steps may be omitted or other intermediate steps added.

At step 1100, each of the primary and secondary computers 200, 300 checks for the presence of a two-dimensional (2D) barcode in their respective image data. An example of a 2D barcode is the stacked linear symbol format PDF417 (ISO standard 15438).

At step 1102, if a 2D barcode is found, control proceeds to step 1104; otherwise, control proceeds to step 1110.

At step 1104, a determination is made as to whether the barcode found at step 1102 is present in the image data received from the bottom camera 154. For instance, in some embodiments, both the primary computer 200 and the secondary computer 300 perform the same flowchart steps illustrated in FIG. 11. In the event that the primary computer 200 detects a barcode and reaches step 1104, the result of step 1104 will be "yes" because the primary computer 200 is coupled to and initially processing the image data from the bottom camera 154 at this step. Alternatively, in the event that the secondary computer 300 detects a barcode and reaches step 1104, the result of step 1104 will be "no" because the secondary computer 300 is not initially processing the image data from the bottom camera 154. Likewise, if the computers 200, 300 are processing image data received from the other of the computers 200, 300 (i.e., work sharing) then the "yes"/"no" results may be the opposite depending on whether the image data came from the bottom camera 154.

At step 1106, the primary computer 200 outputs a message on the touchscreen 112 suggesting that the user flip the ID document 150 (and/or future documents 150 to be scanned) so that it is in the face-down-barcode-up orientation. Although either the primary or secondary computer can and do still process the barcode regardless of the card orientation in this embodiment, speed is improved by training users to place ID cards and others documents 150 face down (barcode up) because in this way the user may keep their fingers on the back of the card (i.e., the upward facing side with the barcode) without obstructing any of the information of the card 150 utilized in the authentication process.

Most two-side ID cards 150 have security features and biometric identification information on the front side of the card (i.e., the side of the card that includes the cardholder's picture). The 2D barcode is present on the back side of the card and is typically positioned along upper portion of the backside of the document 150. In this way, a user can position the card on the bottom platform with the front of the card facing downward and fully visible to the bottom camera 154, while the barcode on the back is still unobstructed by the user's fingers and visible to the top camera 146.

Figure 20:
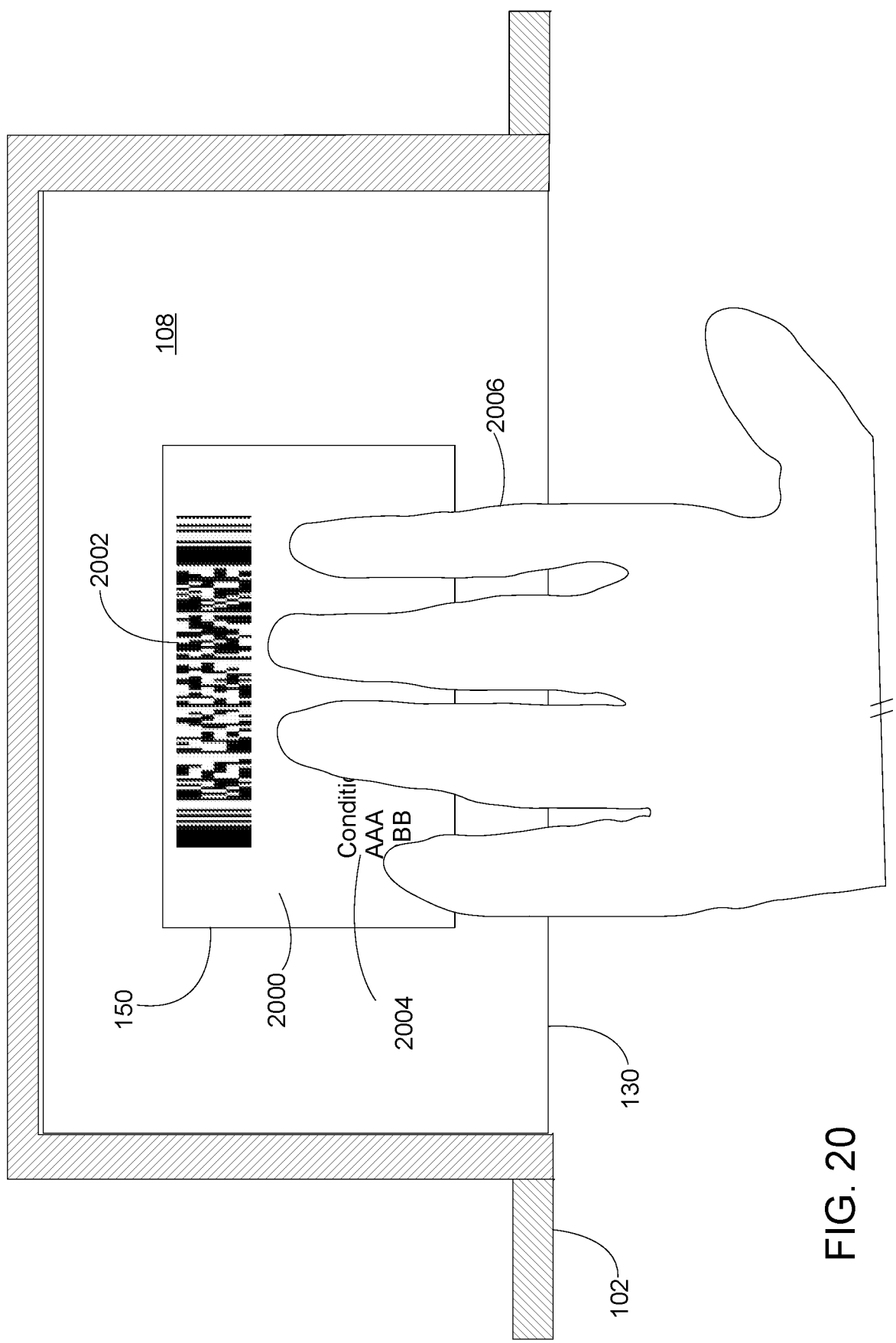
FIG. 20 illustrates a top-down cross section view of the document scanning area while a user is holding a two-sided card so that a barcode is facing upwards and remains visible while the user keeps their fingers on the card according to an exemplary embodiment.

FIG. 20 illustrates a top-down cross section view of the document scanning area 108 while a user is holding a two-sided card 150 backside 2000 upwards so that a barcode 2002 is facing upwards towards the top camera 146 according to an exemplary embodiment. With this method of operation, the user may hold the card 150 still on the bottom platform 130 until getting results from the document scanner 100 via the touchscreen 112. Once the results are displayed, the user may remove the card 2000. The process can occur very quickly and beneficially there is no need for the user to remove their fingers 2006 from the backside 2000 of the card 150 during the automatic authentication process performed by the document scanner 100. Although the user's fingers 2006 may obstruct other text or materials 2004 on the backside of the card 2000, these other portions of text typically are not required during the authentication process. In some embodiments, the barcode 2002 on the backside 2000 along with all text and security layer(s) on the frontside (downward facing side) of the card 150 remain unobstructed and are sufficient to perform the various authentication processes described herein.

In the event a particular valid variant and/or fake variant and/or security layer do require the user to remove their fingers 2006 in order to allow the top camera 146 to get a full picture of the backside 2000, the primary computer 200 may display an instruction for the user to remove their hand on the touchscreen 112. Likewise, an instruction to remove the user's hand may also be displayed via touchscreen 112 if the user's fingers 2006 are obstructing the barcode 2002. For instance, not all barcodes are on the top of the document—some are located in a bottom area. Likewise, it is also possible that a user may be holding the document upside down or sideways and fingers will be obstructing the barcode.

Returning to FIG. 11, at step 1108 assuming the barcode is facing up, the secondary computer 300 processes the 2D barcode 2002 (if any) found in the image data from the top camera 146 and, assuming there is one, checks whether it matches a known document class 900 and/or type 902. In this embodiment, assuming the user follows the suggested process for car orientation, the computer 200, 300 that will typically be executing step 1108 to actually decode the barcode is the secondary computer 300 since only the secondary computer 300 is checking for a 2D barcode 2002 in the image data from the top camera 146. However, the primary computer 200 may also check for a 2D barcode in the same manner at this step. The 2D barcode 2002 on the backside 2000 of most 2-sided identification cards 150 includes data representative of the class 900 and/or type 902 of the document. If a document class 900 and/or type 902 is detected from the barcode 2002, the secondary computer 300 will inform the primary computer 200 of the detected type 902 (or vice versa) and then proceed to step 1116 to check whether there is a type consensus with the co-processor (i.e., the primary computer 200 in this embodiment). Alternatively, if there is no 2D barcode 2002 found or there is a barcode 2002 but no document class 900 or type 902 information can be decoded from the barcode 2002, control proceeds to step 1110.

At step 1110, the primary computer 200 and/or the secondary computer 300 performing this step loads a valid variant 904 for a common document type 902. In preferred embodiments, the two computers 200, 300 each keep a database in memory 206, 208, 306, 308 logging types 902 of documents 150 detected in the past X predetermined number of days (e.g., 30 days). By grouping these log entries on distinct document types 902 and then sorting by the number of each distinct type 902 detected in the last predetermined number of days (e.g., 30 days), the two computers 200, 300 each have a dynamically changeable order of the most common document types 902. This order of most common types 902 may be affected by the venue 702 location of the document scanner 100. For instance, a document scanner 100 located in California will likely have more California driver's licenses detected over the last 30 days than Florida driver's licenses. However, a document scanner 100 located in Florida would likely find that Florida driver's licenses are more common than California driver's licenses. In this way, depending on the actual history for the document scanner 100, one of the more common document types 902 are loaded at this step. As will be explained further (in particular with respect to FIG. 18), work sharing and parallel processing may be performed by both the primary computer 200 and the secondary computer 300 to each simultaneously attempt to match image samples of different and non-overlapping batches of common document types 902 according to the history.

At step 1112, the primary computer 200 and/or secondary computer 300 performing this step checks for requested features of the valid variant 904. This step may involve the computer 200, 300 checking the image data to look for a match of an image sample of the valid variant 904 at a particular x-y position. Typically these image features are visible under the infrared light and therefore the originally capture image data from step 1010 can be utilized. However, in some cases, the required features of valid variant 904 may be visible under other lights sources such as white light and/or UV light and these lights 138, 140, 142 may be activated/deactivated as appropriate and another picture taken at this step. In some embodiments, all three pictures (UV, IR and white light versions) are taken every time and stored in the memory.

At step 1114, the computer 200, 300 performing this step determines whether the type 902 of the document 150 can now be determined based on features of one or more valid variants 904 that have been found. For instance, a valid variant 904 feature may include a crest symbol or other graphic at a particular x-y position on the document 150 and the computer 200, 300 may check the image data to check whether this feature exists in the image data at the correct position. When the required feature exists, this may be sufficient to indicate that the document 150 is a particular type 902 such as a "2019 California Driver's License." When the document type 902 is found, control proceeds to step 1116 to check for consensus with the coprocessor 200, 300. Alternatively, if the required features are not found and the document type 902 is still undetermined, control proceeds to step 1120.

At step 1116, the computer 200, 300 performing this step checks whether both the primary computer 200 and the secondary computer 300 have detected the same document type 902. If the same document type 902 is detected by both computers 200, 300, this means the front side and back side of the document 150 both indicate the same valid document type 902 and control proceeds to node "C" to start the security features validation process 806. Although not specifically illustrated, if the document type 902 detected on a first side is a type 902 of document that has no second side and the second side is blank or otherwise has no detected document type 902, control will also proceed to the security features validation process 806. Alternatively, if the primary computer 200 and the secondary computer 300 detect different types of documents 150, control proceeds to step 1118.

At step 1118, at least one of the primary computer 200 and the secondary computer 300 updates the results data to include an indication that the document 150 in the scanning area 108 is fake. This may occur if the front side appears to be a California driver's license but the barcode 2002 indicates it is a Florida driver's license, for example. Since the document 150 is already known to be fake, control proceeds directly to node "D" for face validation.

At step 1120, the computer 200, 300 performing this step checks whether the co-processor 200, 300 has already detected the document type 902. For instance, during the time that the primary computer 200 is checking the bottom camera 154 image data for a first valid variant 904, the secondary computer 300 may be checking the top camera 146 image data a second valid variant 904. Assuming the secondary computer 300 finds the required features of the second valid variant 904 are present, the secondary computer 300 will determine the document type 902 to be the type corresponding to the second valid variant 904 (e.g., "2019 California Driver's License"). The primary computer 200 will then receive a message from the secondary computer 300 informing the primary computer 200 of the document type 150 detected by the secondary computer 300. If the co-processor 200, 300 has already detected the document type 902, control proceeds to step 1122; otherwise, if neither computer 200, 300 has determined the document type 902 yet, control proceeds to step 1124.

At step 1122, the computer 200, 300 performing this step loads the next valid variant 904 for the detected document type 902. Continuing the above example, to speed the document type authentication process 804, the primary computer 200 may at this step dynamically filter the valid variants 904 to be of the same type 902 as the detected document type 902 received from the secondary computer 300. In other words, if the secondary computer 300 detects the document type 902 to be "2019 California Driver's License", there is little reason for the primary computer 200 to continue checking for image samples found on a "2019 Florida Driver's License"—even if the Florida Driver's Licenses are more common based on the historic log data.

At step 1124, the computer 200, 300 performing this step loads the next valid variant 904 based on the order of most common types detected by the document scanner 100 similar to as done at step 1110. In other words, when there is no information about what type 902 of document 150 is in the document scanning area 108, the most commonly encountered document types 902 are checked first to increase the likelihood of a quick match.

Figure 12:
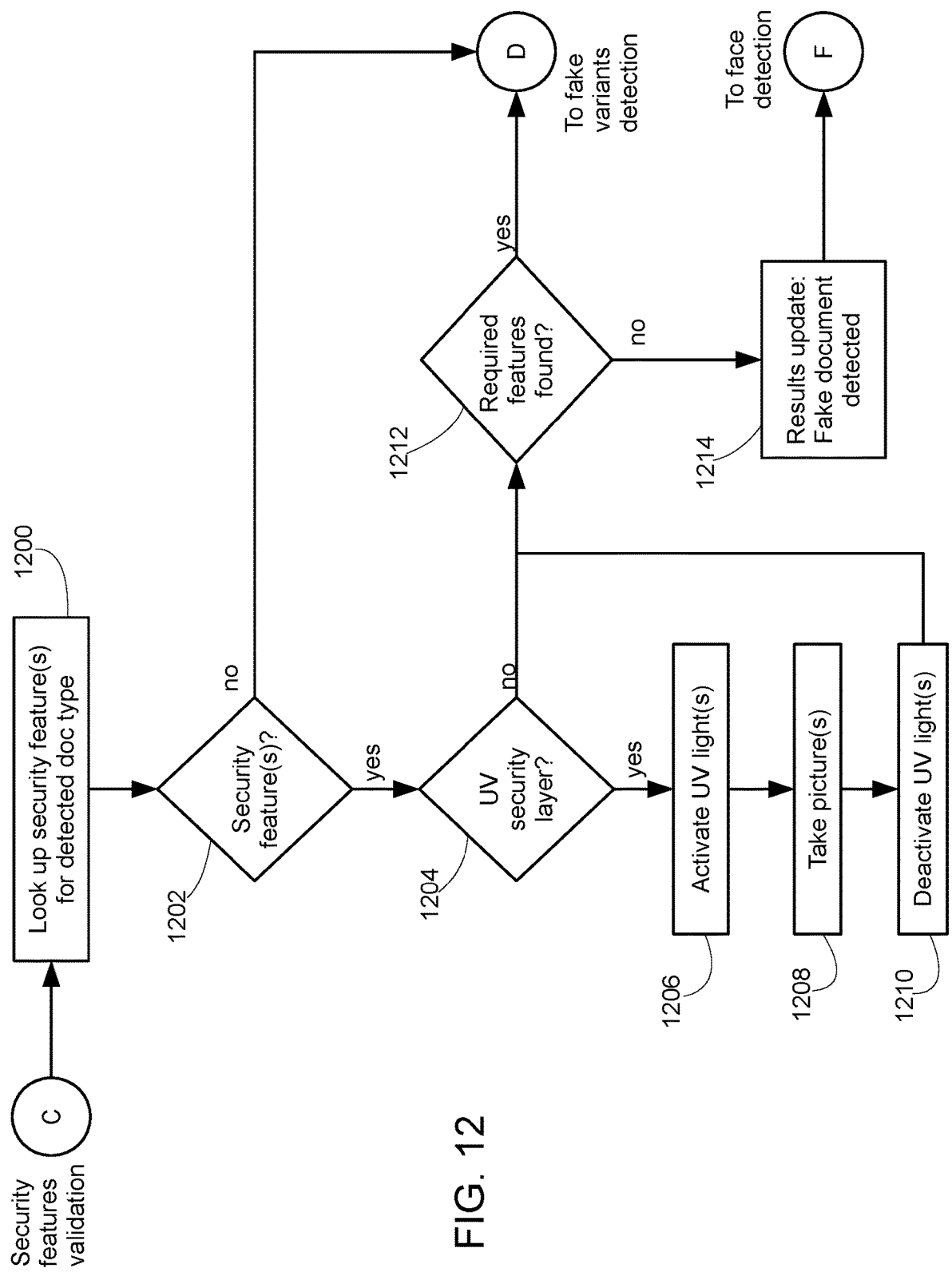
FIG. 12 shows a flowchart of a method of performing the security features validation of step of FIG. 8 according to an exemplary embodiment.

FIG. 12 shows a flowchart of a method of performing the security features validation 806 of step 806 of FIG. 8 according to an exemplary embodiment. The steps of FIG. 12 may be performed by the primary and secondary computers 200, 300 of the document scanner 108 illustrated in FIG. 6, for example. The steps of the flowchart are not restricted to the exact order shown, and, in other configurations, shown steps may be omitted or other intermediate steps added.

At step 1200, the computer 200, 300 performing this step looks up the security feature(s) 908 for the detected document type 902. For instance, the security features 908 may include a UV layer on the card 150 that includes an image feature that appears at a certain x-y position under UV light.

At step 1202, the computer 200, 300 performing this step checks whether there are one or more security features 908 for the document type 902. When yes, control proceeds to step 1204 to check for the features; alternatively, control proceeds to start the fake variants detection process 808.

At step 1204, the computer 200, 300 performing this step checks whether the security feature 908 to be checked involves a UV security layer. When yes, control proceeds to step 1206; otherwise, control proceeds to step 1212.

At step 1206, the computer 200, 300 performing this step activates the UV light(s) 140 within the enclosure 102 thereby illuminating the document 150 with UV light.

At step 1208, the computer 200, 300 coupled to the camera 146, 154 with lens facing the UV layer controls said camera 146, 154 to take a picture. For instance, assuming the UV layer is on the downward facing side of the document 150, the primary computer 200 controls the bottom camera 154 to take a picture of the downward facing side. If both sides include UV layers then both cameras 146, 154 may take pictures at this step.

At step 1210, the computer 200, 300 performing this step deactivates the UV lights 140.

At step 1212, the computer 200, 300 performing this step processes the image data in order to check for the required security features 908. Assuming the document includes a UV layer ("yes" branch from step 1204), the image data received from the camera(s) 146, 154 that took the picture(s) at step 1208 is checked for the UV security layer features 908. When the required security features 908 are found, control proceeds to step 1212 to start checking the fake variants 906. Alternatively, if the required security features 908 are not found, control proceeds to step 1214.

At step 1214, at least one of the primary computer 200 and the secondary computer 300 updates the results data to include an indication that the document 150 in the scanning area 108 is fake. This may occur if the document type 902 has a required security feature 908 such as an image that only appears under UV light. Assuming the image does not appear under UV light, the document 150 is already known to be fake and control skips proceeds directly to node "F" for face validation 812.

Again, pictures of three light types may also have been taken earlier on in the process and the UV light picture image can simply be check in memory 206, 208, 306, 308 directly at steps 1206, 1208, 1210. In some embodiments, the light activation and UV picture taking of steps 1206 and 1208 are instead automatically performed by the computers 200, 300 at step 1112 (or even step 1010) in order to take pictures using all supported light conditions (e.g., UV, IR, and white light) at the same time and to store these pictures in the memory 206, 208, 306, 308.

Figure 13:
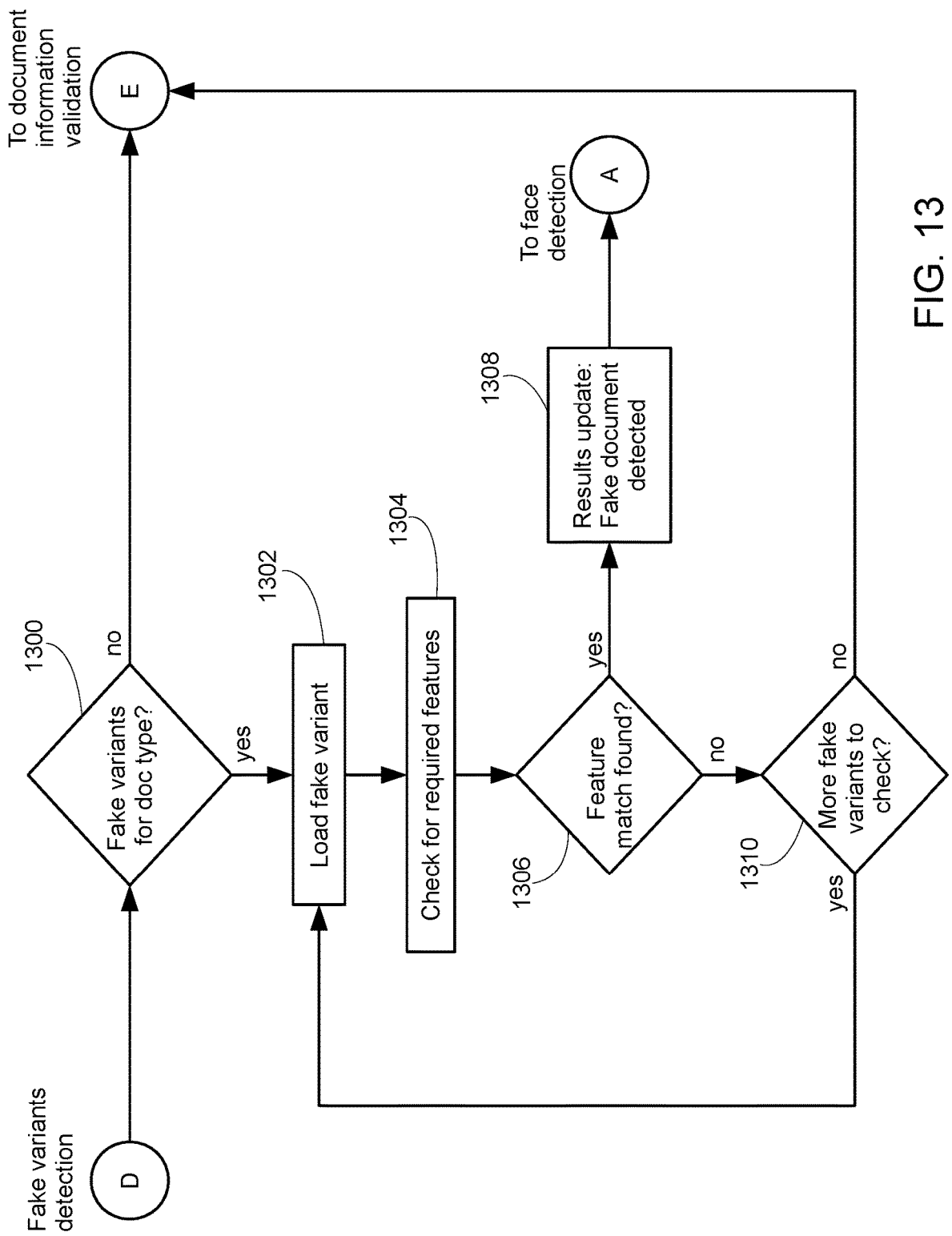
FIG. 13 shows a flowchart of a method of performing the fake variants detection of step of FIG. 8 according to an exemplary embodiment.

FIG. 13 shows a flowchart of a method of performing the fake variants detection of step 808 of FIG. 8 according to an exemplary embodiment. The steps of FIG. 13 may be performed by the primary and secondary computers 200, 300 of the document scanner 100 illustrated in FIG. 6, for example. The steps of the flowchart are not restricted to the exact order shown, and, in other configurations, shown steps may be omitted or other intermediate steps added.

At step 1300, the computer 200, 300 executing this step checks to see whether there are any fake variants 906 for the detected document type 902. If there are no fake variants 906 for the document type 902, control proceeds to node "E" to start the document information validation process 810. On the other hand, if there is at least one fake variant 906 for the detected document type 902, control proceeds to step 1302.

At step 1302, the computer 200, 300 executing this step loads the first fake variant 906. In some cases, similar to how the scanner 100 orders the valid variants 904 based on the most commonly detected card types 902 in the past predetermined number of days (e.g., 30 days), the fake variants 906 may also be similarly ordered based on the log history. However, usually there are not that many fake variants 904 for a particular document type 902 and they may all be checked very quickly by a single processor (e.g., the primary computer 200) in any order.

At step 1304, the computer 200, 300 executing this step checks the image data for the required feature of the fake variant 906. Typically these image features are visible under the infrared light and therefore the originally capture image data from step 1010 can be utilized. However, in some cases, the required features of specific fake variant 906 may be visible under other lights sources such as white light and/or UV light and these lights 138, 140, 142 may be activated/deactivated as appropriate and another picture taken at this step. Alternatively, in embodiments where pictures utilizing all light conditions are taken together (e.g., at step 1112 or 1010), the computer 200, 300 will already have image data under the other light sources stored in memory 206, 208, 306, 308 and can directly check said image data at this step without needing to take further pictures.

At step 1306, the computer 200, 300 executing this step determines whether the required features of the fake variant 906 are present. The determination of whether the document matches the required features of a fake variant 906 in some embodiments involves checking against a threshold number of features. For instance, a fake variant threshold may require matching three out of a possible five fake variant features in order for the fake variant 906 to be determined as a match. Each variant feature may also have a weighting associated with it such that a sum of the detected variant features must exceed a minimum threshold in order to determine the document matches the variant. When the required features of a fake variant are determined to be present, control proceeds to step 1308; otherwise, control proceeds to step 1310.

At step 1308, at least one of the primary computer 200 and the secondary computer 300 updates the results data to include an indication that the document 150 in the scanning area 108 is fake. This may occur if the document type 902 has a known fake variant 906 and the required features for that known fake variant 906 are found in the image data. Since the document 150 is already known to be fake, control proceeds directly to node "F" for the face validation step 812.

At step 1310, the computer 200, 300 executing this step checks whether or not there are more fake variants 906 for the detected document type 902 to check. If there are more fake variants 906 to check, control proceeds to step 1302 to load the next fake variant 906; otherwise, control proceeds to node "E" to start the document information validation process.

Figure 14:
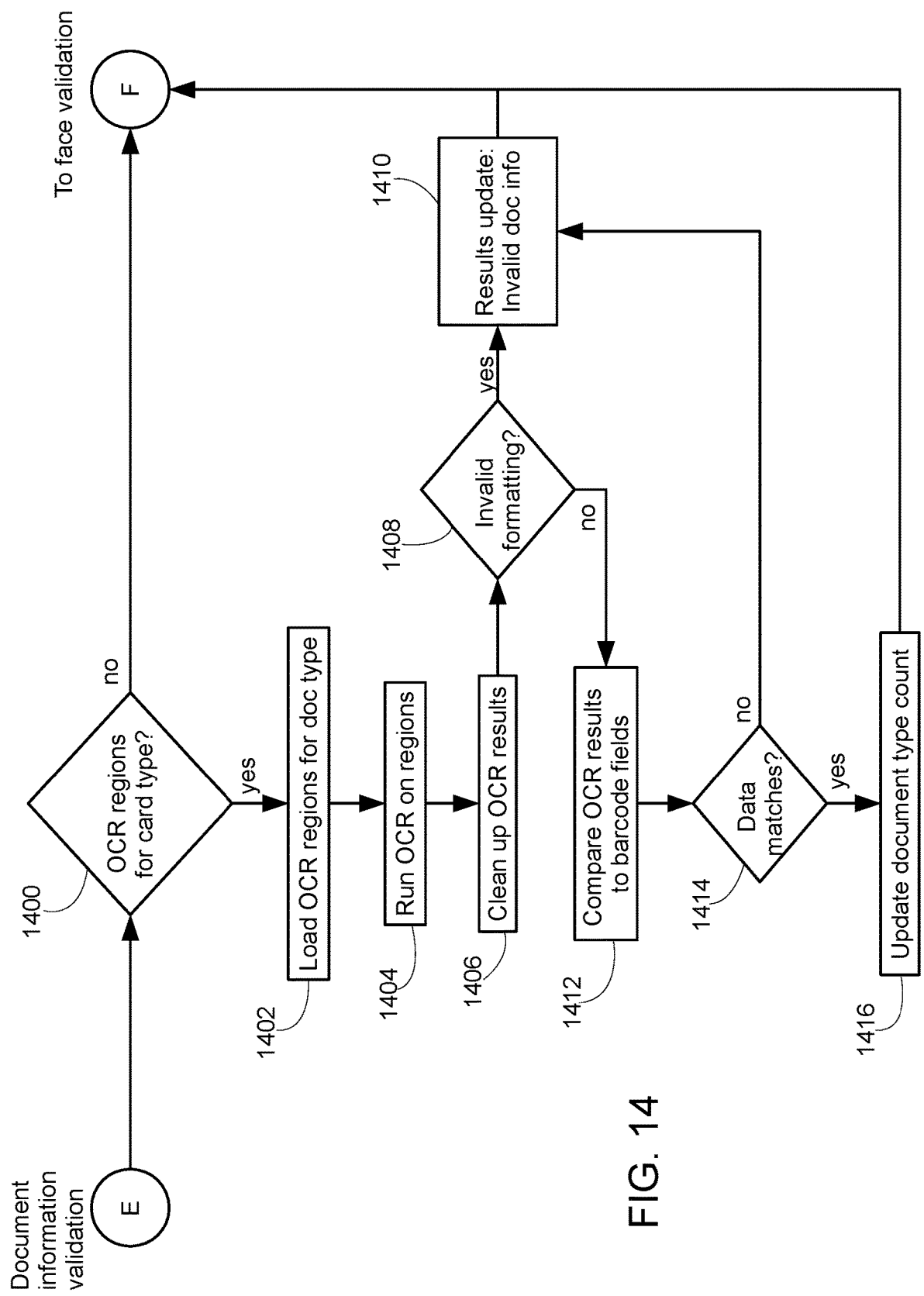
FIG. 14 shows a flowchart of a method of performing the document information validation of step of FIG. 8 according to an exemplary embodiment.

FIG. 14 shows a flowchart of a method of performing the document information validation of step 810 of FIG. 8 according to an exemplary embodiment. The steps of FIG. 14 may be performed by the primary and secondary computers 200, 300 of the document scanner 100 illustrated in FIG. 6, for example. The steps of the flowchart are not restricted to the exact order shown, and, in other configurations, shown steps may be omitted or other intermediate steps added.

At step 1400, the computer 200, 300 executing this step determines whether the document type 902 includes any OCR text regions 910 to check. When yes, control proceeds to step 1402; otherwise, the process jumps to node "F" for the face validation phase.

At step 1402, the computer 200, 300 executing this step loads the OCR text regions 910 for the document type 902. The regions contain info on x-y coordinates to crop, and any image correction to run, such as brightening or darkening the image in the selected region.

At step 1404, the computer 200, 300 executing this step performs an optical character recognition (OCR) process on the specific regions of the image data. The actual OCR process can be any well-known OCR process preferably executed local on either the primary computer 200 and/or secondary computer 300. As there are many well-known OCR libraries available, further details of the specific OCR process are omitted herein for brevity.

At step 1406, the computer 200, 300 executing this step cleans up the OCR results. This step involves correcting well known OCR errors such as by changing "G" into "6" when the OCR formatting data indicates that the field or character should be a number. Likewise, the reverse of changing a detected "6" into a "G" is performed if the OCR formatting data indicates that the field or character should a letter. Again, OCR cleanups based on known formatting requirements and common errors using fuzzy logic is a well-known process and further details are omitted herein for brevity.

At step 1408, the computer 200, 300 executing this step checks the result against the OCR formatting data 910 to check whether there is any invalid formatting. For instance, if the OCR region is a name and contains numbers or symbols even after the cleanup step of 1406, this likely means there is a problem with the text. In another example, if the OCR text formatting data 910 specifies that birthday on this particular type 902 of document 150 is specified in the format YYYY/MM/DD but the OCR result shows a date in the format DD/MM/YYYY or has another error such as an invalid month number, this also indicates invalid formatting. When a problem is a detected, control proceeds to step 1410; otherwise, if everything appears okay with the OCR formatting, control proceeds to step 1412.

At step 1410, the computer 200, 300 executing this step updates the results data to indicate that there is invalid document information detected. This is not necessarily a fatal error as OCR processes are notoriously problematic in the face of dirty or scratched or otherwise damaged documents. However, the invalid results are noted and a warning can be displayed to the user to do a manual verification.

At step 1412, the computer 200, 300 executing this step compares the OCR results with the encoded data stored in the barcode 2002. This step may involve the primary computer 200 sending the OCR results from a first side of the document 150 to the secondary computer 300 for comparison with the information decoded from the barcode 2002 on the other side of the document 150, or vice versa. The two computers 200, 300 together exchange information and check whether the biometric information such as the cardholder's age, name, birthday, hair color, etc. are consistent as indicated on the face-side of the document and the barcode encoded information.

At step 1414, the computer 200, 300 executing this step determines whether the data encoded in the barcode 2002 matches the data resulting from the OCR process. When yes, this means the barcode 2002 is consistent with human readable text printed on the document and control proceeds to step 1416; otherwise, if the OCR text does not match the barcode encoded data, there is a problem and control proceeds to step 1410.

At step 1416, the computer 200, 300 executing this step determines that the document has passed authentication and is not a fake and does not contain any problematic or otherwise invalid information. The document type 902 count for this type of document is therefore incremented. This step may be performed by logging the successful card type 902 along with the current date and time in the historic log. As mentioned in steps 1110 and 1124, the number of occurrences of detecting a specific document type 902 in the past affects the order that the valid variants 904 are checked on future cards 150. The more likely document type valid variants 904 are checked first to increase the chances of a quick match.

Figure 15:
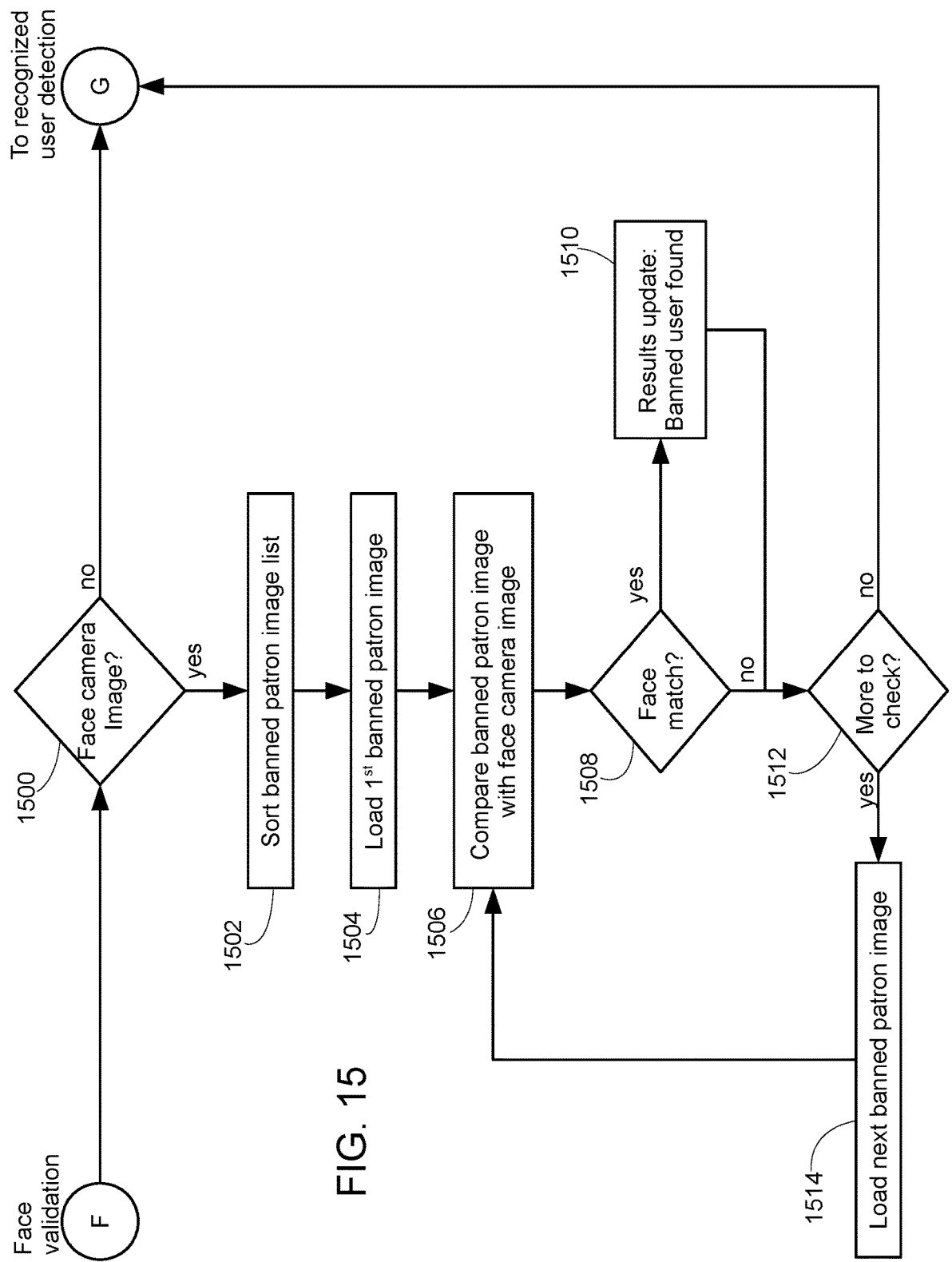
FIG. 15 shows a flowchart of a method of performing the face validation process of step of FIG. 8 according to an exemplary embodiment.

FIG. 15 shows a flowchart of a method of performing the face validation process of step 812 of FIG. 8 according to an exemplary embodiment. The steps of FIG. 15 may be performed by the primary and secondary computers 200, 300 of the document scanner illustrated in FIG. 6, for example. The steps of the flowchart are not restricted to the exact order shown, and, in other configurations, shown steps may be omitted or other intermediate steps added.

At step 1500, the computer 200, 300 executing this step determines whether there is a face camera 110 image available. In some embodiments, the face camera 110 and the associated face validation process 812 is omitted or disabled and control proceeds directly to step the recognized user detection process. If the face camera 110 functionality is to be used, control proceeds to step 1502.

At step 1502, the computer 200, 300 executing this step optionally re-sorts a banned patron image list. The banned patron image list is a set of images that have been taken of patrons that have been banned from one or more venues 702 under the system 700 for troublesome behavior such as fighting, drugs, payment failure, or other criminal or disallowed behavior. Sorting the banned patron image list may involve sorting the list to be in an order of proximity where banned patrons that have previously been banned at the current venue are listed first, banned patrons previously banned at neighboring venues are listed next, and so on. Sorting by proximity helps to speed the matching process and can allow alerts to go out quickly when a banned patron is found. This step may also be omitted if all banned patron images are going to be searched and/or if the list is already sorted in the desired order.

At step 1504, the computer 200, 300 performing this step loads the first banned patron image from the list.

At step 1506, the computer 200, 300 compares the banned patron image loaded at step 1504 with 1) the face camera image captured from the face camera 110 mounted on the document scanner 100, and 2) the picture included on the document itself (if present) such as the cardholder's picture found on a driver's license or passport. Both pictures are compared to the banned patron image at this step. Again, the actual image comparison technique may any well-known image comparison library and further details are omitted herein for brevity.

At step 1508, the computer 200, 300 executing this step determines whether the face of the banned person matches the face camera image within a predetermined threshold of variance. Assuming a match is found, control proceeds to step 1510; otherwise, control proceeds to step 1512.

At step 1510, the computer 200, 300 executing this step updates the results data to include the banned user information.

At step 1512, the computer 200, 300 executing this step determines whether there are more banned patron images to check. In some embodiments for maximum speed, after a first banned user results are found, control can skip directly to the recognized user detection process; however, in this embodiment, control continues to step 1514 to check all banned patron images. Checking all banned patron images and gathering up a possible plurality of matches is beneficial to pass a complete set of aliases, fake documents, and associated history of venue entry information of a particular banned patron to a desired entity such as a mobile device operated by a venue manager. When there are more banned patron images to check, control proceeds to step 1514; otherwise, control skips to the recognized user detection process.

At step 1514, the computer 200, 300 executing this step loads the next banned patron image and control returns to step 1506 to compare with the face camera image.

Figure 16:
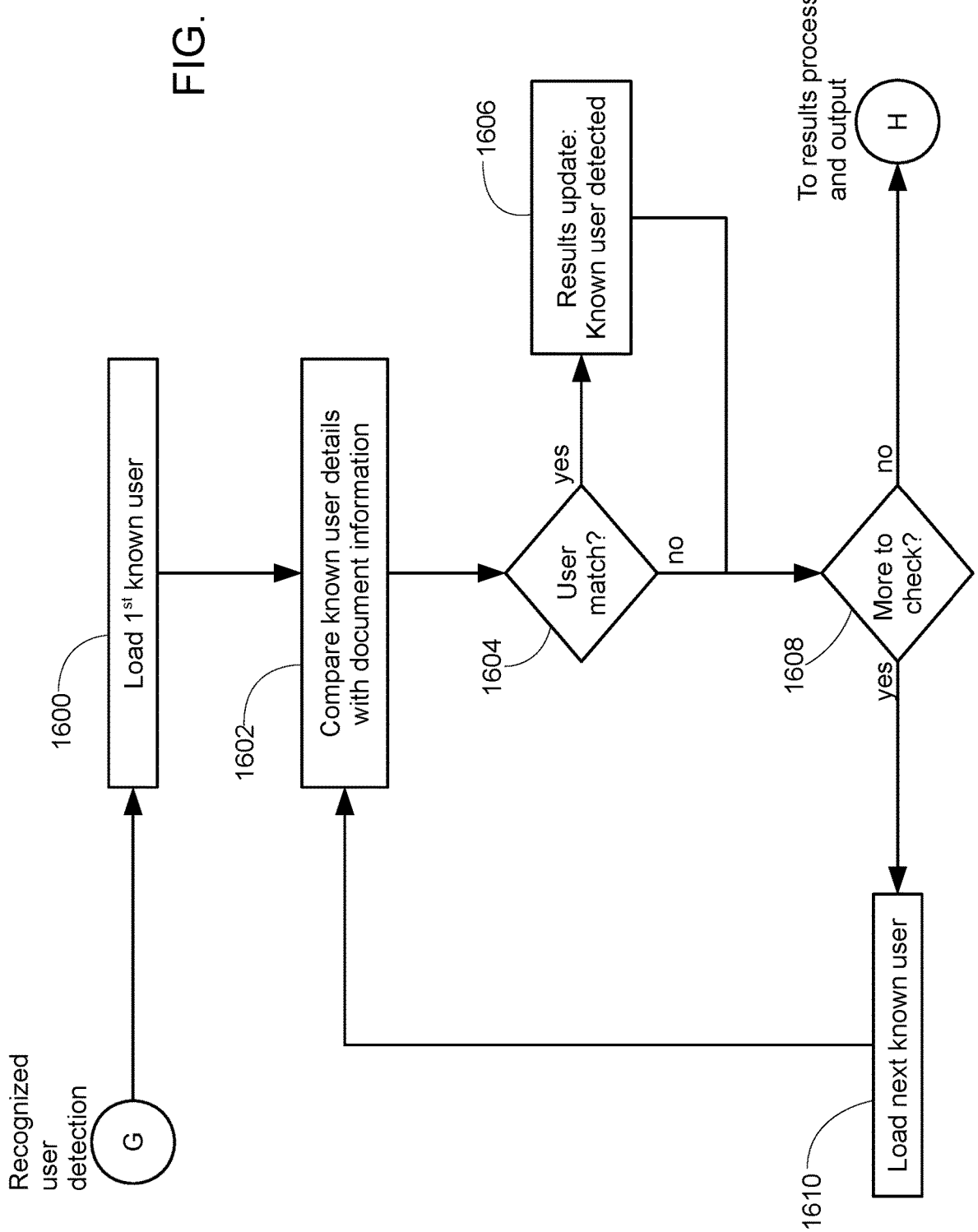
FIG. 16 shows a flowchart of a method of performing the recognized user detection process of step of FIG. 8 according to an exemplary embodiment.

FIG. 16 shows a flowchart of a method of performing the recognized user detection process of step 814 of FIG. 8 according to an exemplary embodiment. The steps of FIG. 16 may be performed by the primary and secondary computers 200, 300 of the document scanner 100 illustrated in FIG. 6, for example. The steps of the flowchart are not restricted to the exact order shown, and, in other configurations, shown steps may be omitted or other intermediate steps added.

The recognized user detection process 814 is somewhat similar to the face validation process 812 except instead of matching on face camera images, the process is matching on user details such as names and other personal information.

At step 1600, the computer 200, 300 executing this step loads details of a first known user. Again, the memory 206, 208, 306, 308 of the document scanner 100 (and the central server(s) 718) may include a plurality of known user details sorted into any desired order. The known users may include banned users and may also include VIP users. Both good and bad users may be searched at this step.

At step 1602, the computer 200, 300 compares the known user details with the details found on the document. The comparison performed at this step can involve matching the document "name" field as found in the barcode and/or OCR regions with the name of the known user. A combination of fields may also be checked such as combination of name and birthday (or name, birthdate, and address) with the stored details of the known user.

At step 1604, the computer 200, 300 performing this step determines whether the user details compared at step 1602 match. The match may be a direct or exact match; however, close matches may also be acceptable. For instance, if last name matches that may be sufficient to trigger a match even if the first names are different. Likewise, common nicknames such as "Dave" for "David" and the like may also be considered a match. Stored users may have a plurality of aliases and if any one of the aliases matches that may be considered a match at this step. When user data extracted from the document 150 matches stored data of a known user, control proceeds to step 1606; otherwise, control proceeds to step 1608.

At step 1606, the computer 200, 300 performing this step updates the results data to include details of the matched user.

At step 1608, the computer 200, 300 executing this step determines whether there are more known users to check. In some embodiments for maximum speed, after a first known user is found, control skips directly to the results processing and output process; however, in this embodiment, control continues to step 1610 to check known users. Checking all known users and gathering up a possible plurality of matches is beneficial to pass a complete set of aliases, fake documents 150, and associated history of venue 702 entry information of a particular banned patron to any desired destinations such as venue managers and/or other parties. When there are more known users to check, control proceeds to step 1610; otherwise, control skips to the recognized user detection process.

At step 1610, the computer 200, 300 executing this step loads details of the next known user and control returns to step 1602 to compare with the document information.

Figure 17:
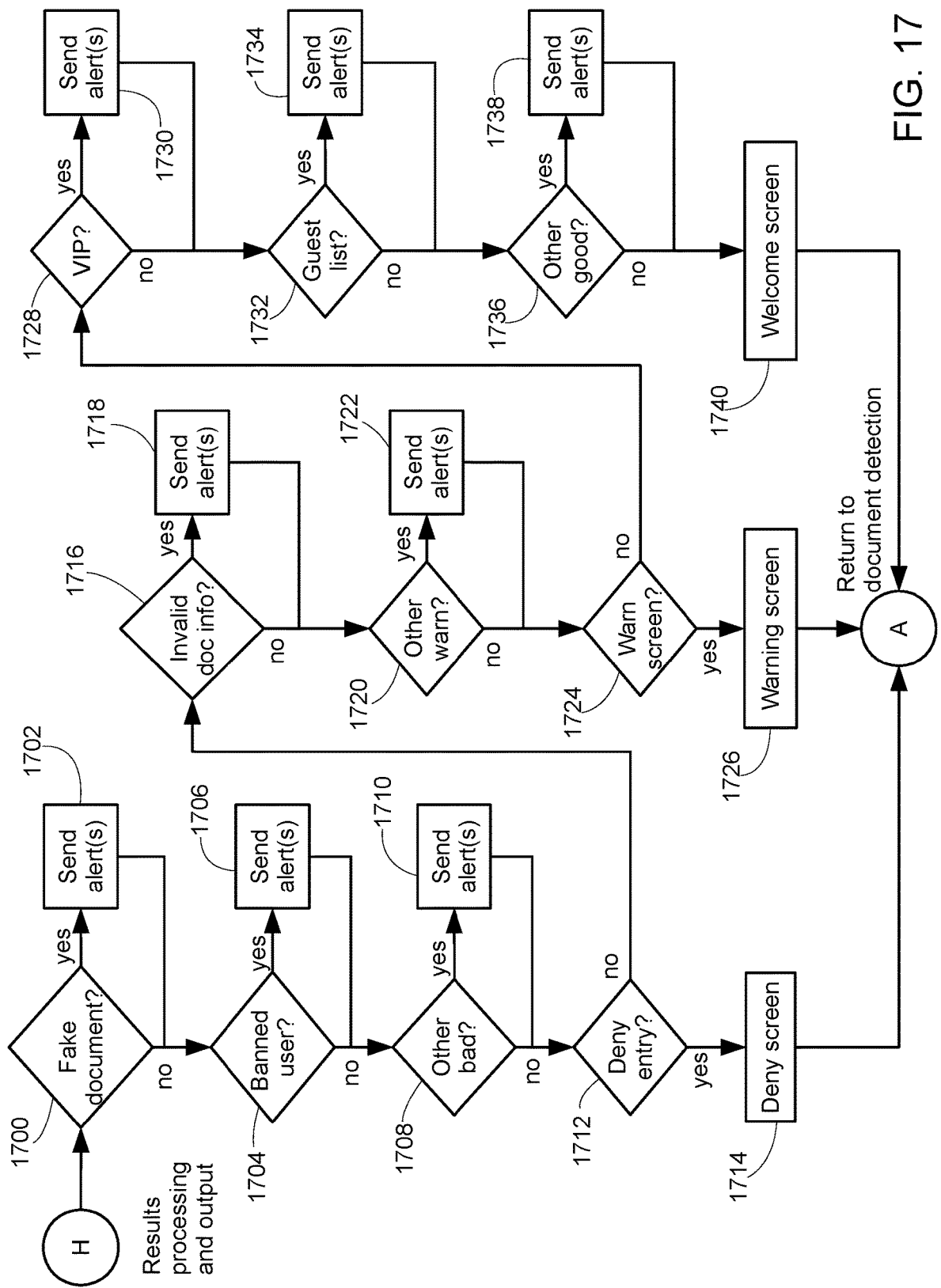
FIG. 17 shows a flowchart of a method of performing the results processing and output process of step of FIG. 8 according to an exemplary embodiment.

FIG. 17 shows a flowchart of a method of performing the results processing and output process of step 816 of FIG. 8 according to an exemplary embodiment. The steps of FIG. 17 may be performed by the primary and secondary computers 200, 300 of the document scanner 100 illustrated in FIG. 6, for example. The steps of the flowchart are not restricted to the exact order shown, and, in other configurations, shown steps may be omitted or other intermediate steps added.

At step 1700, the computer 200, 300 executing this step, typically the primary computer 200, checks whether the results data includes an indication that the document 150 is a fake. When yes, control proceeds to step 1702 to send one or more alerts. The alerts may be sent to mobile device(s) such as phones or tablet computers of bouncers and/or venue managers to alert them there is likely going to be an altercation at the document scanner 100.

At step 1704, the computer 200, 300 checks whether the results data includes an indication that the user is a banned user. When yes, control proceeds to step 1706 to send one or more alerts. Again, the alerts may be sent to bouncers and/or venue manager. Depending on a threat level that can be dynamically determined at this step by the computer 200, 300, one or more alerts may also be sent to any user-configurable external party. For instance, if the user was banned for illegal activity at a previous venue, the document scanner may automatically notify a venue manager of the user's presence at the current venue 702.

At step 1708, the computer 200, 300 checks whether any other bad user results were found. Examples of other bad user results that may be checked include a minor attempting to enter a licensed facility or a male patron attempting to enter a female only area of a venue etc. Again, when yes, control proceeds to step 1710 to send one or more alerts as appropriate.

At step 1712, the computer 200, 300 checks whether any conditions sufficient to deny entry to the venue 702 are present. In this embodiment, step 1712 will be "yes" when any of the previous steps 1700, 1704, and/or 1708 are "yes". In the event the patron is to be denied entry, control proceeds to step 1714; otherwise, control proceeds to step 1716.

At step 1714, a deny entry screen is displayed and statistics concerning the patron and reasons for the denied entry are saved to the log of the document scanner 100. Control then returns to node "A" to the document detection process to begin authenticating a next document/next patron.

At step 1716, the computer 200, 300 checks whether any invalid document information was found. Examples include the invalid formatting or information of the OCR regions for example. When yes, control proceeds to step 1718 to send one or more optional alerts.

At step 1720, the computer 200, 300 checks to determine whether there are any other reasons to warn the user of the document scanner 100 about the patron or the document 150 presented for authentication. Examples of other situations include names that are close to matching a banned patron or face images that are close to matching but not an exact match. When yes, control proceeds to step 1722 to send one or more alerts as appropriate.

At step 1724, the computer 200, 300 checks whether a warning screen is required. In this embodiment, the result of step 1724 will be "yes" when any of the previous steps 1716 and/or 1720 are "yes". In the event a warning screen is required, control proceeds to step 1726; otherwise, control proceeds to step 1728.

At step 1726, a warning screen about the patron and/or document are displayed on the touchscreen 112 and statistics concerning the patron and reasons for the warning are saved to the log of the document scanner 100. Control then returns to the document detection process to begin authentication a next document/next patron.

At step 1728, the computer 200, 300 checks whether the patron is a very important person (VIP) guest. When yes, control proceeds to step 1730 to send one or more alerts such as to the venue manager to go and welcome the VIP guest. VIP members may also receive special items such as free drinks and bar tenders may also be notified.

At step 1732, the computer 200, 300 checks whether the patron is a member of a preferred guest list. When yes, control proceeds to step 1734 to send one or more alerts as appropriate. Guest list members may have special offers and receive messages upon entry as well.

At step 1736, the computer 200, 300 checks whether any other good conditions are detected that may require sending one or more alerts. When yes, control proceeds to step 1738.

At step 1740, a welcome screen is displayed informing the staff member operating the document scanner than both the document presented for authentication and the patron are cleared and approved for entry to the venue. Control then returns to the document detection process to begin authentication a next document/next patron.

Figure 18:
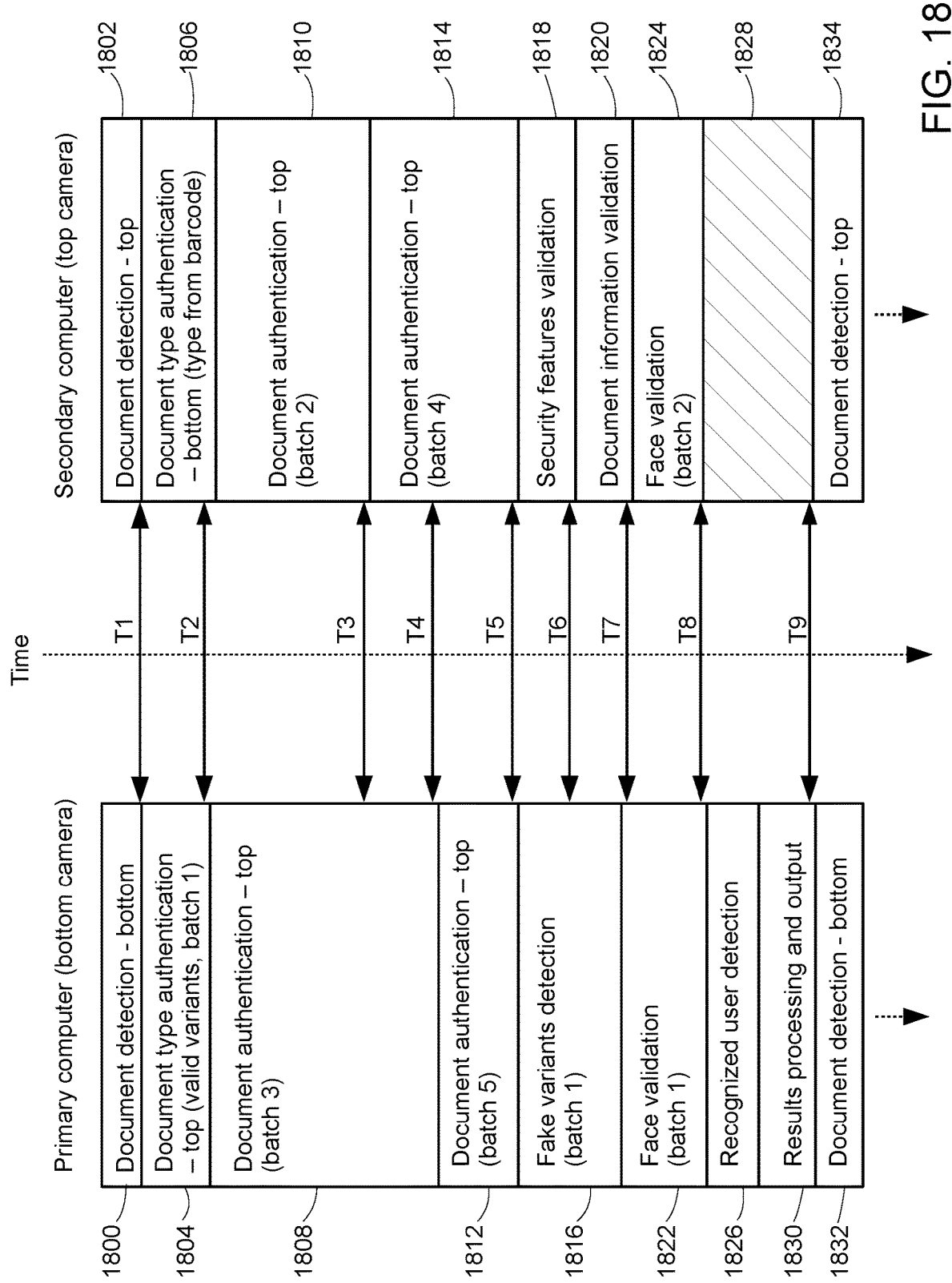
FIG. 18 shows a timeline example of operations and interactions performed in parallel by the primary computer and the secondary computer when executing the method of FIG. 8 according to an exemplary embodiment.

FIG. 18 shows a timeline example of operations and interactions performed in parallel by the primary computer 200 and the secondary computer 300 when executing the method of FIG. 8 according to an exemplary embodiment.

As shown in the block diagram of FIG. 6, in this embodiment it is assumed that the document scanner 100 includes a plurality of two computers 200, 300 that can process image and other data independently. The two computers 200, 300 communicate with each other over an internal network formed in this embodiment by a crossover Ethernet cable 402.

The timeline example starts with both the primary computer 200 and the secondary computer 300 performing the document detection step of 802 (further described in the flowchart of FIG. 10). The primary computer 200 is coupled to the bottom camera 154 and, during a first time duration 1800, determines edges and document boundaries as present in the bottom image data captured by the bottom camera 154. The secondary computer 300 is coupled to the top camera 146. During a similar time duration 1802, the secondary computer 300 determines edges and document boundaries as present in the top image data. At time T1, the primary and secondary computers 200, 300 communicate with each other to exchange boundary information and ensure they each see a document 150 present at similar x-y coordinates in the document scanning area 108.

During a next time duration 1804, the primary computer 200 performs document type authentication on the top image. The primary computer 200 takes a first batch of valid variants 904 being the X most common document types 902 seen at the document scanner 100. For instance, the top ten most common document types 902. During a similar time duration 1806, the secondary computer 300 detects and decodes a 2D barcode 2002 present in the image data from the top image data (i.e., the backside 2000 of a two-sided document 150 placed on the bottom platform 130 of the document scanning area 108). Since it is generally very quick for the secondary processor 300 to decode the barcode 2002, the secondary computer 300 wins the race of which computer 200, 300 will first determine some type 902 information at time T2. The secondary computer 300 and primary computer 200 then exchange information regarding the document type 902 identified by the secondary computer 300 and further exchange data regarding next batches of valid variants 904 that need to be checked for the detected document type 902. Since the secondary computer 300 has finished the barcode decoding and is available for work sharing, in this embodiment the primary computer 200 transfers the bottom image data from the bottom camera 154 to the secondary computer 300 via the internal network over cable 402. The primary computer 200 also assigns a second batch of valid variants 904 related to the detected type 902 to the secondary computer 300. During time duration 1810, the secondary computer 300 goes to work looking for matches of the second batch of valid variants 904. During a similar time duration 1808, the primary computer 200 goes to work on a third batch of valid variants 904 (different than the second batch) such that both the primary and secondary computers 200, 300 are again working in parallel to increase speed of the document scanner 100 as a whole finding a document type match.

At time T3, the secondary computer 300 finishes checking the last valid variant 904 in the second batch. In this example, none of the second batch is a match and therefore the two computers 200, 300 exchange data at time T3 to assign a fourth batch of valid variants 904 to the secondary computer 300. The secondary computer 300 goes to work during time duration 1814 to check this fourth batch.

At time T4, the primary computer finishes checking the last variant 904 in the third batch. Again, for purposes of this example it is assumed that none of the third batch is a match and therefore the two computers 200, 300 exchange data at time T4 to assign a fifth batch of valid variants 904 to the primary computer 200. During time duration 1812, the primary computer 200 goes to work checking the valid variants 904 in the fifth duration.

At time T5, the primary computer 200 finds a match of a valid variant 904 in the fifth batch. Again, finding a match may mean matching a number of predetermined characteristics and image portions that allow the primary computer 200 with matching success of at least a predetermined threshold thereby allowing the primary computer 200 to definitively determine the bottom image data from the bottom camera 154 matches a valid variant 904 of the same document type 902 specified in the barcode 2002 as decoded by the secondary computer 300. At time T5, the primary computer 200 and the secondary computer 300 exchange data letting the secondary computer 300 know the document type 902 is now determined. The secondary computer 300 then stops processing the fourth batch (because a match has already been found) and begins validating the security features 908 for the determined document type 902 during time duration 1818. Starting at a similar time point, the primary computer 200 begins checking a first batch of fake variants 906 during time duration 1816.

At time T6, the secondary computer 300 finishes confirming that the required security features 908 are present and begins processing the document information validation during time duration 1820. At time T6, the primary and secondary computers 200, 300 exchange information that the security features 908 are validated.

At time T7, the secondary computer 300 finishes validating document information and the primary computer 200 finishes checking the first batch of fake variants 906. In this example, it is assumed that one of the first batch of fake variants 906 was a match; thus, at time T7, the primary computer 200 and the secondary computer 300 exchange data assigning a first batch of recognized user face images to the primary computer 200 and a unique (different) second batch of recognized user face images to the secondary computer 300. Again, if the fake variants 906 had not matched on the first batch, the two computers 200, 300 would have exchanged next batches of fake variants 906 in order to work share on finding whether any of the fake variants 906 matched.

During time duration 1822, the primary computer 200 works on checking whether any of the first batch of known user face images matches the image data captured from the face camera 110 and/or ID cardholder image. Likewise, during time duration 1824, the secondary computer 300 works on checking whether any of the second batch of known user face images matches the image data captured from the face camera 110.

At time T8, the secondary computer 300 finds a match of one of the known user face images and the two computers 200, 300 exchange data about this fact. At this point, the secondary computer 300 is finished working and rests during time duration 1828 while the primary computer 200 checks the recognized user detection during time duration 1826 and then performs results processing and output at time duration 1830.

At time T9, the two computers 200, 300 exchange data of the results determined by the primary computer 200 and then reset their operations back to the document detection process to begin work on the document for a next patron. This is shown in time durations 1832 and 1834, which effectively restart the process and correspond to the starting time durations 1800 and 1802, respectively.

As shown in the above timeline example, both the primary computer 200 and secondary computer 300 work together in parallel to share work and increase the speed for reaching the results. As shown, having two computers 200, 300 as is done in this embodiment substantially cuts the processing time in half. If increased speed is desired, it is possible to have additional secondary computers that operate in a similar manner as described. In some embodiments, more than one secondary computers 300 are included to work share and assist a primary computer 200. Likewise, in yet other embodiments a single primary computer 200 can be utilized without work sharing with other computers. Multiple cores or processors of a single computer can also be used for parallel work sharing in a similar manner. The one or more processors 204, 304 in each computer 200, 300 may be included in a central processor unit (CPU) of a computer acting as the document scanner in some embodiments. The plural form of the word "processors" is utilized herein as it is common for a CPU of a computer 200, 300 to have multiple processors 204, 304 (sometimes also referred to as cores); however, it is to be understood that a single processor 204, 304 may also be configured to perform the described functionality in other implementations.

In embodiments with a battery 400, the battery 400 may be rechargeable and have a storage capacity sufficient to run the unit fully on battery power for a duration of at least five hours (e.g., to cover typical bar/club hours from 9 pm to 2 am). A charging platform may be built into the pedestal and/or there may also be a docking stating into which the document scanner 100 is positioned when not in use for charging and also for receiving updates from the central server 718. In some embodiments, the document scanner 100 is fully self-sufficient unit that can operate on battery power and includes its own power supply and databases of all the image samples and other associated data illustrated in FIG. 9 stored in onboard memory 206, 208, 306, 308. In this way, the document scanner 100 can be set up anywhere outside of a venue and does not require any network connections or external power during actual usage. The document scanner 100 process is fast and efficient and lineups move quickly increasing patron satisfaction. Rather than a battery 400 (or in addition to the battery 400), in some embodiments standard AC power is utilized and a power circuit such as an AC-to-DC converter is provided inside the document scanner 100.

In cases where network communications are desired, a mobile wireless transceiver 408 such as 3G, 4G, or when available 5G provides communication to one or more central server(s) 718 anywhere cell phone communications are supported. Likewise, when a local area network 706 or Internet 708 connection is available, the primary computer 200 and/or secondary computer 300 may also communicate with other devices via said connections.

Figure 19:
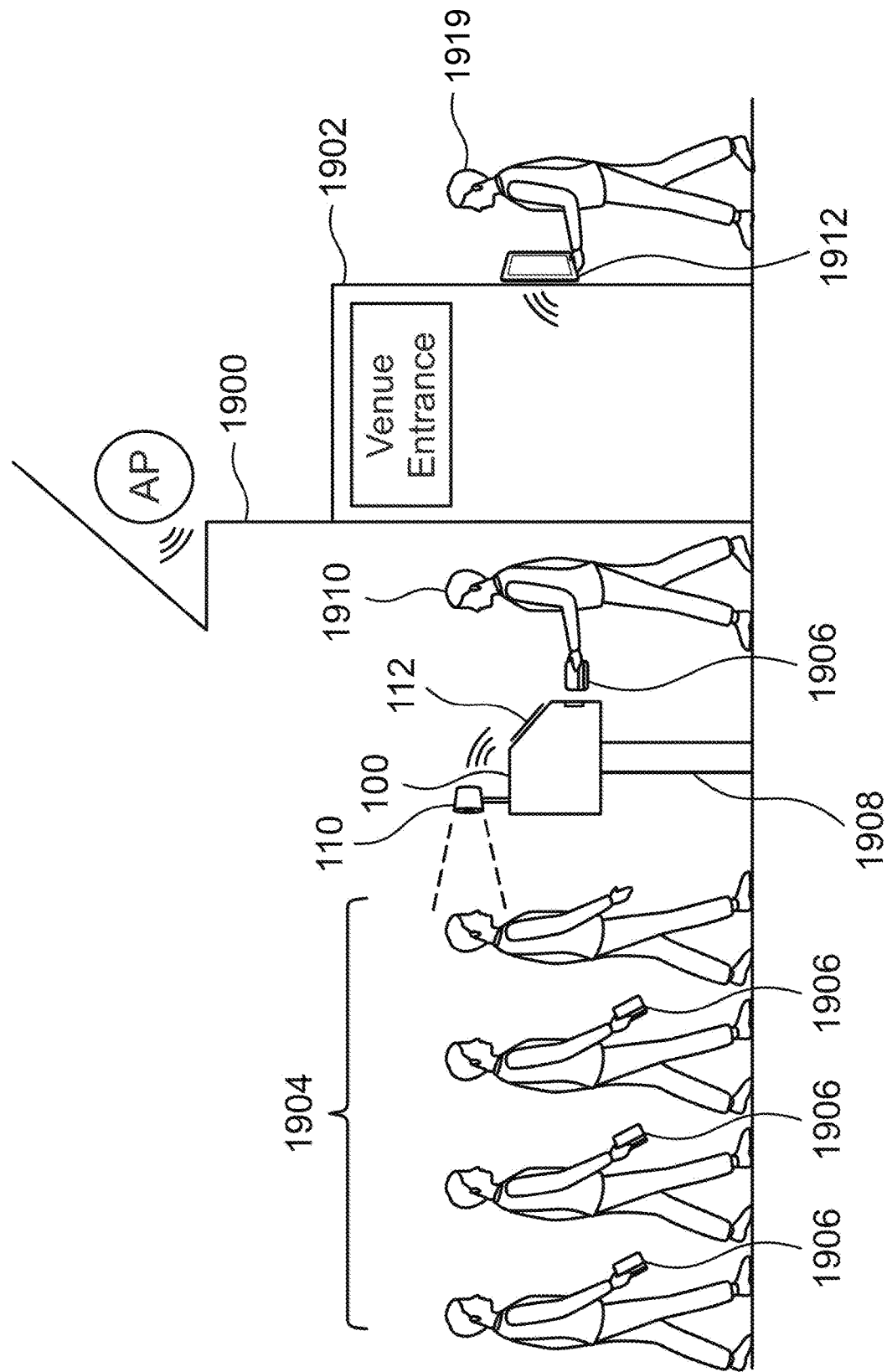
FIG. 19 illustrates an example use-case scenario of the document scanner and system with a plurality of patrons lined up to enter a venue according to an exemplary embodiment.

FIG. 19 illustrates an example use-case scenario with a plurality of patrons 1904 lined up to enter a venue 1900. Each patron has a document 1906 ready to be checked. A staff member 1910 receives documents 150 from a patron 1904 at the beginning of the line. The document scanner 100 is mounted on a pedestal 1908 outside the venue entrance 1902. The face camera 110 takes a picture of the patron's face and the staff member places the document 1906 to be authenticated into the document scanning area 108. Results are displayed on the touchscreen 112. In the event the results are negative meaning the patron is to be denied entry, an alert can be sent to a second staff member 1919 for display on a tablet computer 1912 or another electronic device. In some embodiments, the second staff member 1919 may also view real time scanning results on another device 1912 that essentially mirrors the results shown on the touchscreen 112 local to the document scanner. Messages and data are passed representing the results and alerts are passed from the document scanner 100 to the second device 192 via a wireless and/or wired local area network (LAN), wireless local area network (WLAN), or even wide area network (WAN) such as the Internet 708. In addition to passing results data during, the communications paths may also be utilized to send updated statistics such as banned users detected or other data to the central servers 718. Updates of the firmware and/or other software for performing the above steps of the flowcharts may also be sent from the central server(s) 718 to the document scanner 100.

Although the invention has been described in connection with preferred embodiments, it should be understood that various modifications, additions and alterations may be made to the invention by one skilled in the art without departing from the spirit and scope of the invention.

For example, although the internal LAN coupling the primary computer 200 and the secondary computer 300 in FIG. 6 is shown as a crossover Ethernet cable 402, in other embodiments, the computers 200, 300 are coupled via a wireless network such as provided by the wireless interfaces 210, 320. Likewise, although the above embodiments utilize top and bottom mirrors 144, 152 to "fake" the distance required to take a perfect picture of the full ID on both sides, the mirrors 144, 152 are not required if the enclosure 102 is made larger. In other embodiments, the top and bottom cameras 146, 154 are focused with optical axis directly at the document platform without utilizing any intermediate mirrors. In addition to checking images of the top and bottom sides of the document 150 to be authenticated, other data such as RFID data captured by an RFID reader 122 positioned adjacent the opening 106 can be utilized in similar manner. Biometric information such as name and age data read by the reader 122 from an RFID chip on the document may be compared with that encoded in the barcode 2002 and/or with the textual information printed on the card.

Although the above-description has focused on a checking identification documents and patrons outside of an age-restricted venue, in other embodiments and applications, document scanners 100 and systems 700 disclosed herein may equally be applicable to any location wishing to check documents. Any desired type of document 150 may be authenticated including but not limited to identification (ID) cards, driver's licenses, passports, and other forms of government issued identification documents. Likewise, non-government issued identification documents may also be authenticated in a similar manner such as employee badges and other private-entity issued documents. Documents may also be verified in a similar manner at non-age-restricted applications that still care about ID authentication.

The above flowcharts and functionality may be implemented by software executed by one or more processors operating pursuant to instructions stored on a tangible computer-readable medium such as a storage device to perform the above-described functions of any or all aspects of the document scanner 100 and/or other elements of the system 700. Examples of the tangible computer-readable medium include optical media (e.g., CD-ROM, DVD discs), magnetic media (e.g., hard drives, diskettes), and other electronically readable media such as flash storage devices and memory devices (e.g., RAM, ROM). The computer-readable medium may be local to the computer executing the instructions, or may be remote to this computer such as when coupled to the computer via a computer network such as the Internet. The processors may be included in one or more general-purpose or specific-purpose computer such as embedded computers that may become the document controller 100 or any of the above-described computers 200, 300 as a result of executing the instructions.

In other embodiments, rather than being software modules executed by one or more processors, the above flowcharts and functionality may be implemented as hardware modules configured to perform the above-described functions. Examples of hardware modules include combinations of logic gates, integrated circuits, field programmable gate arrays, and application specific integrated circuits, and other analog and digital circuit designs. Functions of single modules may be separated into multiple units, or the functions of multiple modules may be combined into a single unit. Unless otherwise specified, features described may be implemented in hardware or software according to different design requirements. Likewise, unless otherwise specified, features and components described herein may be omitted or optional in some embodiments. For instance, to provide just a few examples, the face camera 110 may be omitted in some embodiments, likewise, the steps for validating the face of the cardholder may be omitted in some embodiments, the RFID reader 122 may be omitted in some embodiments, and the internal battery 400 may be omitted in some embodiments, In addition to a dedicated physical computing device, the word "server" may also mean a service daemon on a single computer, virtual computer, or shared physical computer or computers, for example. All combinations and permutations of the above described features and embodiments may be utilized in conjunction with the invention.

What is claimed is:

1. An apparatus for authenticating documents, the apparatus comprising:
   an enclosure having an opening providing access to a document scanning area within the enclosure;
   a document platform mounted within the document scanning area and formed of a transparent material upon which a document to be authenticated is placed;
   a top mirror mounted within the enclosure above the document platform;
   a top camera mounted within the enclosure and having a lens directed toward a reflective surface of the top mirror;
   a bottom mirror mounted within the enclosure below the document platform;
   a bottom camera mounted within the enclosure and having a lens directed toward a reflective surface of the bottom mirror; and
   at least one computing device mounted within the enclosure and coupled to the top camera and the bottom camera;
   wherein, relative positions and angles of the top camera and top mirror are such that the top camera has a field of view of a top side of the document platform and an optical axis perpendicular to the top side of the document platform; and
   relative positions and angles of the bottom camera and bottom mirror are such that the bottom camera has a field of view of a bottom side of the document platform and an optical axis perpendicular to the bottom side of the document platform; and
   by the at least one computing device executing instructions loaded from a storage device, the at least one computing device is configured to:
      process a plurality of image data received from the top camera and the bottom camera in order to determine whether the document placed on the document platform meets one or more predetermined characteristics at least including comparing information extracted from a barcode in first image data corresponding to a first side of the document with text information extracted utilizing an optical character recognition process performed on second image data corresponding to a second side of the document; and
      generate data for display to a user of the apparatus indicating results of whether the document meets the one or more predetermined characteristics.

2. The apparatus of claim 1, further comprising:
   a plurality of lights of different types mounted within the enclosure;
   wherein the plurality of lights at least include a white light, an infrared light, and an ultraviolet light; and
   the at least one computing device is further configured to control activation of the lights at different times in order to capture a plurality of different images from at least one of the top camera and the bottom camera under a plurality of different lighting conditions and to determine whether the document placed on the document platform meets different predetermined characteristics under each of the different lighting conditions.

3. The apparatus of claim 1, wherein the at least one computing device is further configured to generate an indication to the user of the apparatus to flip the document over in response to detecting a two-dimensional barcode in bottom image data received from the bottom camera.

4. The apparatus of claim 1, wherein the at least one computing device is further configured to dynamically sort an order of the one or more predetermined characteristics in decreasing likelihood of match according to a history of previous results of different documents authenticated by the apparatus, and determine whether the document placed on the document platform meets the one or more predetermined characteristics following the order.

5. The apparatus of claim 1, wherein at least one of the predetermined characteristics is a characteristic of a valid document.

6. The apparatus of claim 1, wherein at least one of the predetermined characteristics is a characteristic of a fake document.

7. The apparatus of claim 1, further comprising:
   a touchscreen mounted on an outside of the enclosure and coupled to the at least one computing device;
   wherein the at least one computing device is further configured to generate data for display on the touchscreen indicating results of whether the document meets the one or more predetermined characteristics.

8. The apparatus of claim 1, further comprising:
   a face camera mounted on an outside of the enclosure and coupled to the at least one computing device;
   wherein the at least one computing device is further configured to compare face image data of a patron presenting the document for authentication as received from the face camera with a plurality of stored face images corresponding to a respective plurality of recognized users; and
   the at least one computing device is further configured to send one or more alerts in response to determining that the face image data of the patron presenting the document matches a particular recognized user of the plurality of recognized users.

9. The apparatus of claim 8, wherein the at least one computing device is further configured to a determine one or more recipients of the one or more alerts according to details of the recognized user stored in a user database.

10. The apparatus of claim 1, further comprising:
a radio-frequency identification (RFID) reader mounted to the enclosure adjacent the document scanning area;
wherein the at least one computing device is further configured to compare RFID information read from the document by the radio-frequency identification (RFID) reader with information extracted from the image data of the document as captured by at least one of the top camera and the bottom camera.

11. The apparatus of claim 1, wherein the at least one computing device comprises:
a first computing device mounted within the enclosure and coupled to the top camera; and
a second computing device mounted within the enclosure and coupled to the bottom camera;
wherein, by the first computing device executing instructions loaded from a first storage device, the first computing device is configured to process a top image received from the top camera in order to determine whether the top side of the document placed on the document platform meets one or more predetermined top-side characteristics; and
by the second computing device executing instructions loaded from a second storage device, the second computing device is configured to process a bottom image received from the bottom camera in order to determine whether the bottom side of the document placed on the document platform meets one or more predetermined bottom-side characteristics.

12. The apparatus of claim 11, further comprising a network cable connected between the first computing device and the second computing device thereby enabling the first computing device and the second computing device to communicate with each other.

13. The apparatus of claim 11, wherein:
the first computing device is further configured to send the top image to the second computing device;
the second computing device is further configured to process the top image in order to determine whether the top side of the document placed on the document platform meets one or more additional predetermined top-side characteristics; and
the one or more additional predetermined top-side characteristics are different than the one or more predetermined top-side characteristics that are checked by the first computing device.

14. The apparatus of claim 11, wherein:
the first computing device is further configured to dynamically update the one or more predetermined top-side characteristics that are being checked by the first computing device in response to receiving a message from the second computing device.

15. The apparatus of claim 11, wherein:
the second computing device is further configured to send the bottom image to the first computing device;
the first computing device is further configured to process the bottom image in order to determine whether the bottom side of the document placed on the document platform meets one or more additional predetermined bottom-side characteristics; and
the one or more additional predetermined bottom-side characteristics are different than the one or more predetermined bottom-side characteristics that are checked by the second computing device.

16. The apparatus of claim 11, wherein:
the second computing device is further configured to dynamically update the one or more predetermined bottom-side characteristics that are being checked by the second computing device in response to receiving a message from the first computing device.

17. The apparatus of claim 1, further comprising a rechargeable battery mounted within the enclosure for providing power to electrical components of the apparatus such that the apparatus can be utilized for at least a predetermined period of time without connection to an external power source.

18. The apparatus of claim 1, wherein the document is a government-issued identification document.

19. An apparatus for authenticating documents, the apparatus comprising:
an enclosure having an opening providing access to a document scanning area within the enclosure;
a document platform mounted within the document scanning area and formed of a transparent material upon which a document to be authenticated is placed;
a top mirror mounted within the enclosure above the document platform;
a top camera mounted within the enclosure and having a lens directed toward a reflective surface of the top mirror;
a bottom mirror mounted within the enclosure below the document platform;
a bottom camera mounted within the enclosure and having a lens directed toward a reflective surface of the bottom mirror; and
at least one computing device mounted within the enclosure and coupled to the top camera and the bottom camera;
wherein, relative positions and angles of the top camera and top mirror are such that the top camera has a field of view of a top side of the document platform and an optical axis perpendicular to the top side of the document platform;
relative positions and angles of the bottom camera and bottom mirror are such that the bottom camera has a field of view of a bottom side of the document platform and an optical axis perpendicular to the bottom side of the document platform; and
by the at least one computing device executing instructions loaded from a storage device, the at least one computing device is configured to:
process a plurality of image data received from the top camera and the bottom camera in order to determine whether the document placed on the document platform meets one or more predetermined characteristics;
generate data for display to a user of the apparatus indicating results of whether the document meets the one or more predetermined characteristics; and
generate an indication to the user of the apparatus to flip the document over in response to detecting a two-dimensional barcode in bottom image data received from the bottom camera.

20. An apparatus for authenticating documents, the apparatus comprising:
an enclosure having an opening providing access to a document scanning area within the enclosure;
a document platform mounted within the document scanning area and formed of a transparent material upon which a document to be authenticated is placed;
a top mirror mounted within the enclosure above the document platform;

a top camera mounted within the enclosure and having a lens directed toward a reflective surface of the top mirror;

a bottom mirror mounted within the enclosure below the document platform;

a bottom camera mounted within the enclosure and having a lens directed toward a reflective surface of the bottom mirror; and at least one computing device mounted within the enclosure and coupled to the top camera and the bottom camera;

wherein, relative positions and angles of the top camera and top mirror are such that the top camera has a field of view of a top side of the document platform and an optical axis perpendicular to the top side of the document platform;

relative positions and angles of the bottom camera and bottom mirror are such that the bottom camera has a field of view of a bottom side of the document platform and an optical axis perpendicular to the bottom side of the document platform; and by the at least one computing device executing instructions loaded from a storage device, the at least one computing device is configured to:

process a plurality of image data received from the top camera and the bottom camera in order to determine whether the document placed on the document platform meets one or more predetermined characteristics;

generate data for display to a user of the apparatus indicating results of whether the document meets the one or more predetermined characteristics; and dynamically sort an order of the one or more predetermined characteristics in decreasing likelihood of match according to a history of previous results of different documents authenticated by the apparatus, and determine whether the document placed on the document platform meets the one or more predetermined characteristics following the order.

* * * * *